US009348441B2

(12) United States Patent
Lee et al.

(10) Patent No.: US 9,348,441 B2
(45) Date of Patent: May 24, 2016

(54) ELECTRONIC DEVICE AND METHOD OF CONTROLLING THE SAME

(71) Applicants:Jaejoon Lee, Seoul (KR); Changeui Han, Seoul (KR); Jaehan Park, Seoul (KR)

(72) Inventors: Jaejoon Lee, Seoul (KR); Changeui Han, Seoul (KR); Jaehan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 13/754,340

(22) Filed: Jan. 30, 2013

(65) Prior Publication Data

US 2013/0194217 A1 Aug. 1, 2013

(30) Foreign Application Priority Data

Feb. 1, 2012 (KR) ........................ 10-2012-0010155

(51) Int. Cl.
*G06F 3/041* (2006.01)
*G06F 3/0482* (2013.01)
*G06F 3/0488* (2013.01)
*G06F 3/0484* (2013.01)

(52) U.S. Cl.
CPC .............. *G06F 3/041* (2013.01); *G06F 3/0482* (2013.01); *G06F 3/04842* (2013.01); *G06F 3/04886* (2013.01)

(58) Field of Classification Search
USPC .......................................................... 715/834
See application file for complete search history.

(56) References Cited

U.S. PATENT DOCUMENTS

| 6,643,824 | B1 * | 11/2003 | Bates et al. | .................... 715/205 |
| 2010/0088653 | A1 * | 4/2010 | Yach et al. | .................... 715/863 |
| 2010/0253620 | A1 * | 10/2010 | Singhal | ......................... 345/157 |
| 2012/0212418 | A1 * | 8/2012 | Shiota | ........................... 345/168 |

FOREIGN PATENT DOCUMENTS

| GB | 2351639 | 1/2001 |
| JP | 2005-269243 | 9/2005 |
| WO | WO 2011/055587 | 5/2011 |
| WO | WO 2011055587 A1 * | 5/2011 |

OTHER PUBLICATIONS

Extended European Search Report for Application No. 13000469.0, dated Jun. 12, 2013.

* cited by examiner

*Primary Examiner* — Charles Hicks
*Assistant Examiner* — Brent D Castiaux
(74) *Attorney, Agent, or Firm* — Ked & Associates, LLP

(57) ABSTRACT

The present invention relates to an electronic device and a method of controlling the same. The present invention provides a new user interface for selecting, executing and controlling an item displayed on a touch screen included in the electronic device. Particularly, the present invention provides an electronic device and a method of controlling the same to manipulate the touch screen included in the electronic device while hardly changing the positions of the hands of a user when the touch screen is manipulated with both hands of the user.

26 Claims, 32 Drawing Sheets

ELECTRONIC DEVICE AND METHOD OF CONTROLLING THE SAME

CROSS-REFERENCE TO RELATED APPLICATION(S)

Pursuant to 35 U.S.C. §119(a), this application claims the benefit of earlier filing date and right of priority to Korean Patent Application No. 10-2012-0010155, filed on 1 Feb. 2012, the contents of which are incorporated by reference herein in their entirety.

BACKGROUND

1. Field

The present invention relates to an electronic device and, more particularly, to an electronic device and a method of controlling the same to provide a new user interface for selecting, executing and controlling an item displayed on a touch screen.

2. Background

With the remarkable development of hardware technology and software technology related to various electronic devices including a mobile terminal, electronic devices can provide or store a variety of functions and information. Accordingly, screens of the electronic devices provide various types of information.

In the case of an electronic device including a touch screen, it is possible to access various types of information provided through the touch screen only using user touch.

The electronic device including a touch screen requires constant development of a new user interface for improving user convenience in access of information provided through the touch screen and execution of functions.

When a touch screen is too large to be manipulated by a user with one hand, the user manipulates the touch screen with both hands. In this case, the user manipulates the touch screen using one hand with the other hand holding the electronic device including the touch screen. This touch screen manipulation environment causes the user inconvenience.

SUMMARY

An object of the present invention is to provide an electronic device and a method of controlling the same to provide a new user interface for selecting, executing and controlling an item displayed on a touch screen.

Another object of the present invention is to provide an electronic device and a method of controlling the same to provide a user interface for improving user convenience when a user manipulates a touch screen of an electronic device with both hands.

According to an aspect of the present invention, an electronic device includes: a touch screen configured to display a first item group including a plurality of items; and a controller configured to provide a first control area displaying a plurality of colors respectively corresponding to the plurality of items and a second control area for executing an item from among the plurality of items to the touch screen, to navigate the plurality of items using the relationship between the plurality of items and the plurality of colors corresponding to the items when a touch signal is received through the first control area, and to execute a specific item from among the plurality of items when a touch signal is received through the second control area.

According to another aspect of the present invention, a method of controlling a mobile terminal including a touch screen includes: displaying a first item group including a plurality of items on the touch screen; providing a first control area displaying a plurality of colors respectively corresponding to the plurality of items and a second control area for executing an item from among the plurality of items to the touch screen; navigating the plurality of items using the relationship between the plurality of items and the plurality of colors when a touch signal is received through the first control area; and executing a specific item from among the plurality of items when a touch signal is received through the second control area.

BRIEF DESCRIPTION OF THE DRAWINGS

The embodiments will be described in detail with reference to the following drawings in which like reference numerals refer to like elements wherein.

DETAILED DESCRIPTION

Figure 1:
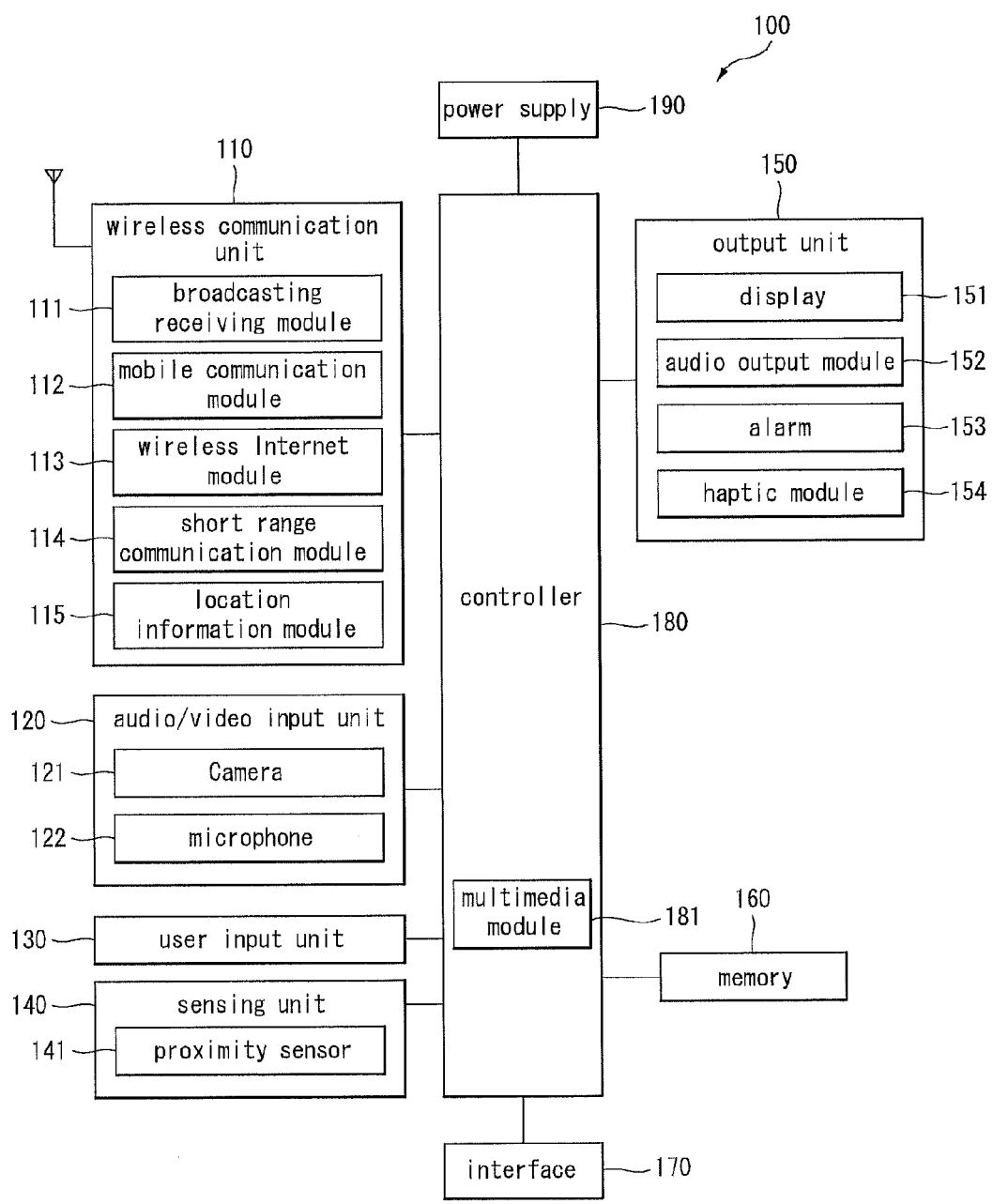
FIG. 1 is a block diagram of a mobile terminal according to an embodiment.

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

The present invention relates to an electronic device and, more particularly, to an electronic device and a method of controlling the same to provide a new user interface for selecting, executing and controlling an item displayed on a touch screen.

The present invention may be implemented in an electronic device including a touch screen, as described below.

According to the present invention, a user interface according to the technical spirit of the present invention is provided to the touch screen when a user touches arbitrary regions of the touch screen with both hands while a plurality of items is displayed on the touch screen of the electronic device.

The user interface can include a first control area corresponding to a plurality of colors respectively corresponding to the plurality of items displayed on the touch screen. When the user interface is provided, the colors respectively corresponding to the plurality of items can be displayed in order to show the relationship between the plurality of items and the plurality of colors corresponding thereto to the user.

The user can select, execute or control the plurality of items through the first control area corresponding to the plurality of colors.

For example, when the user drags the first control area corresponding to the plurality of colors with a finger, an item corresponding to a color displayed on a region dragged by the user's finger.

Furthermore, the user interface can include a second control area provided to a position different from the first control area, which will be described below. The second control area can be allocated a function for navigating a plurality of items displayed on the touch screen in the same manner as that of the first control area or a function for executing a specific item selected through the first control area.

The first control area and the second control area can complement each other to be used to select, execute or control a plurality of items displayed on the touch screen.

Various embodiments of implementing the user interface including the first control area and the second control area will now be explained with reference to the attached drawings.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
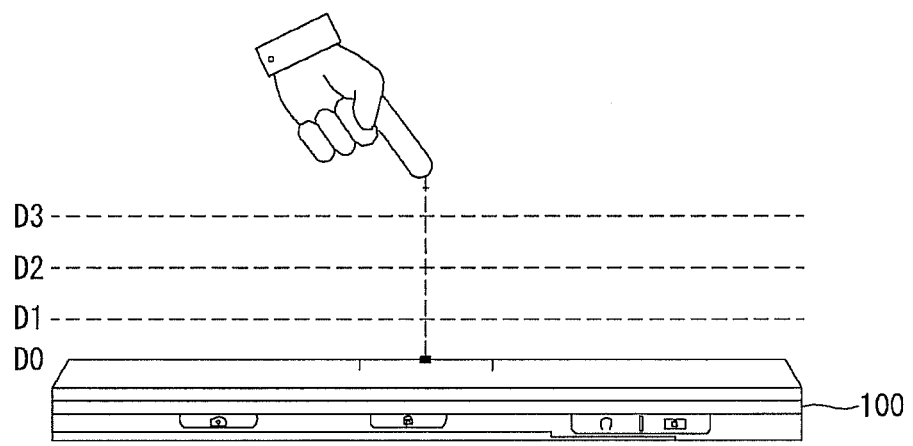
FIG. 2 is a conceptual view for explaining a proximity depth of a proximity sensor 141 shown in FIG. 1.

Next, FIG. 2 is a conceptual view illustrating a proximity depth of the proximity sensor 141. As shown in FIG. 2, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 2 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

Embodiments of the present invention will be described.

It is assumed that the display 151 is a touch screen for convenience of description. As described above, the touch screen 151 can perform both the information display function and information input function. However, the present invention is not limited thereto. Touch described in the specification can include both contact touch and proximity touch.

Figure 3:
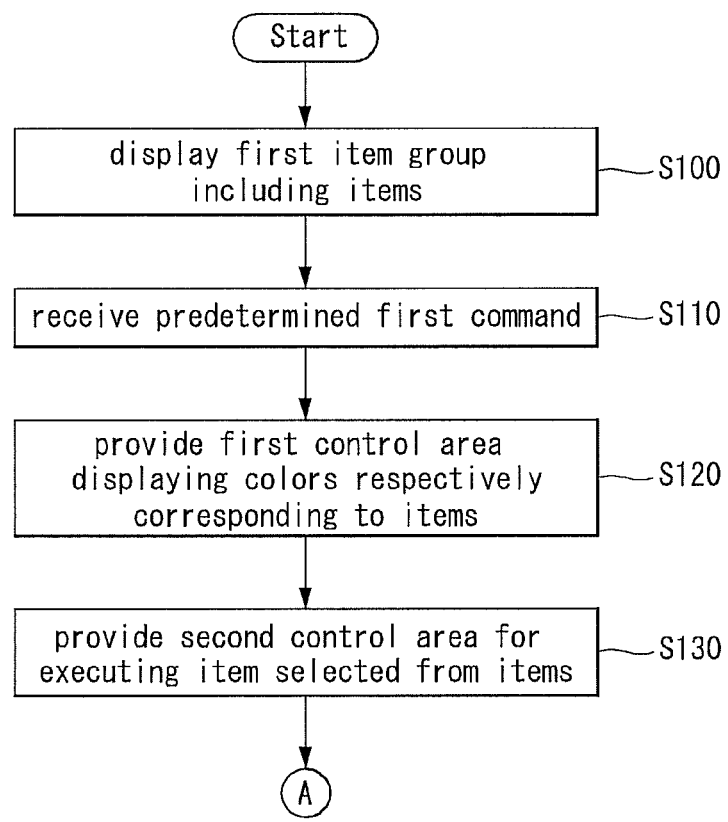
FIG. 3 is a flowchart illustrating a method of controlling an electronic device according to a first embodiment of the present invention.

FIG. 3 is a flowchart illustrating a method of controlling an electronic device according to a first embodiment of the present invention and FIGS. 4 to 8 are views for explaining the method of controlling an electronic device according to the first embodiment of the present invention.

The method of controlling an electronic device according to the first embodiment of the present invention can be implemented in the electronic device 100 described above with reference to FIGS. 1 and 2. Accordingly, the method of controlling an electronic device according to the first embodiment of the present invention and operations of the electronic device 100 for implementing the method will be described in detail with reference to the attached drawings.

Referring to FIG. 3, the controller 180 may display a first item group including a plurality of items on the touch screen 151 (S100).

Figure 4:
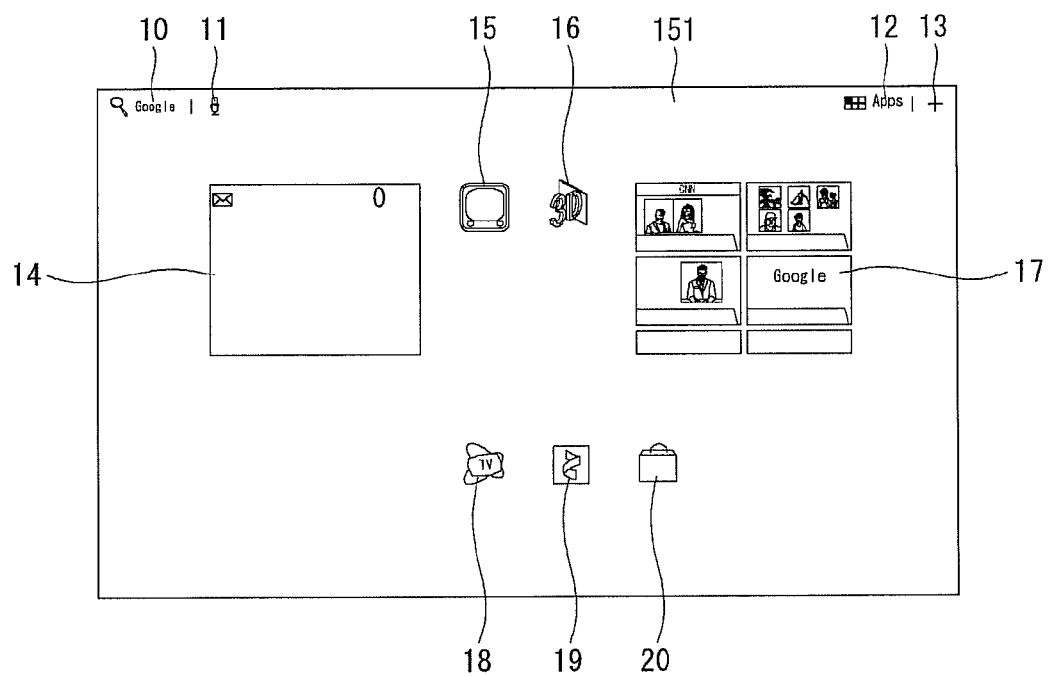
FIGS. 4 to 8 are views for explaining the method of controlling an electronic device according to the first embodiment of the present invention.

FIG. 4 shows an exemplary screen on which step S100 is executed.

Referring to FIG. 4, the controller 180 can display the plurality of items 10, 11, 12, 13, 14, 15, 16, 17, 18, 19 and 20 on the touch screen 151 of the mobile terminal 100.

The plurality of items may include all items that can be selected. For example, the plurality of items can include a menu, a widget, an item, etc., as shown in FIG. 4. Furthermore, the plurality of items can include a folder, a file, etc.

In FIG. 4, reference numerals 10, 11, 12, 13, 14, 15, 16, 17, 18, 19 and 20 respectively represent first, second, third, fourth, fifth, sixth, seventh, eighth, ninth, tenth and eleventh items.

The controller 180 may receive a predetermined first command for activating a graphic user interface (GUI) proposed by the present invention while the first item group including the plurality of items is displayed on the touch screen 151 (S110).

The predetermined first command may be set in various manners.

Figure 5:
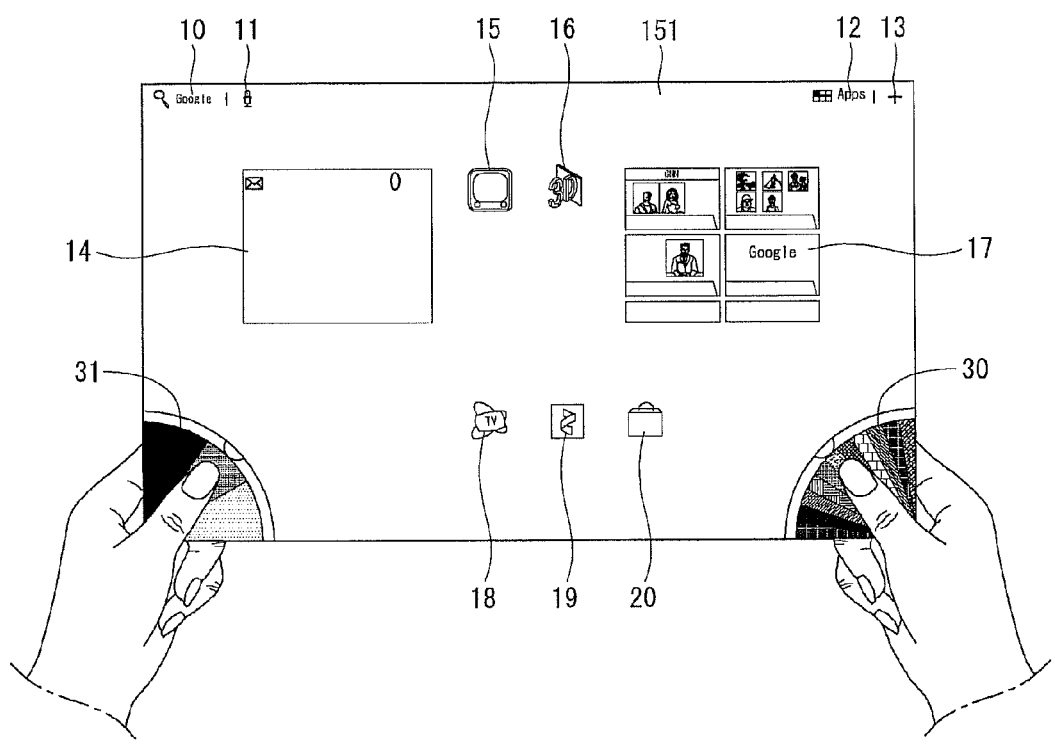

For example, when a user simultaneously touches two different predetermined regions of the touch screen 151 with two fingers, as shown in FIG. 5, the controller 180 can recognize the touches of the two fingers as the predetermined first command for activating the GUI.

The predetermined two different regions may be regions in which first and second control areas, which will be described below, are respectively displayed.

When the user directly touches the predetermined two different regions with two fingers, the controller 180 can recognize the direct touches as the predetermined first command. Furthermore, when the user proximity-touches the predetermined two different regions with two fingers, the controller 180 can recognize these proximity touches as the first command. The proximity touches are as described above with reference to FIGS. 1 and 2.

For example, the predetermined first command may be set such that it is received through a specific physical key or soft key included in the mobile terminal.

The controller 180 may provide, to the touch screen 151, the first control area that displays a plurality of colors respectively corresponding to the plurality of items and the second control area for executing an item from among the plurality of items upon receiving the first command (S120 and S130).

Referring to FIG. 5, when the predetermined first command is received since the user touches (directly touches or proximity-touches) the predetermined two different regions with two fingers, the controller 180 can activate the first control area 30 and the second control area 31 and provide the first control area 30 and the second control area 31 to the touch screen 151.

When the controller 180 receives the first command again, receives a predetermined second command different from the first command, or does not receives any touch input through the first control area 30 and the second control area 31 for a predetermined time while the first control area 30 and the second control area 31 are activated and provided to the touch screen 151, the controller 180 can deactivate the first control area 30 and the second control area 31, or delete the first control area 30 and the second control area 31 from the touch screen 151.

Figure 6:
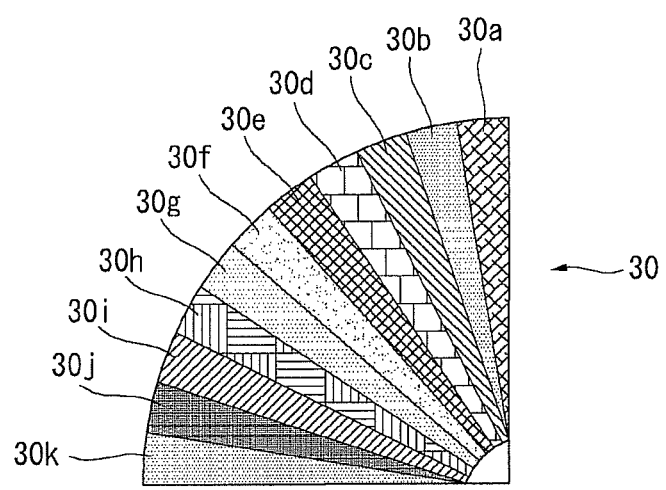
Figure 7:
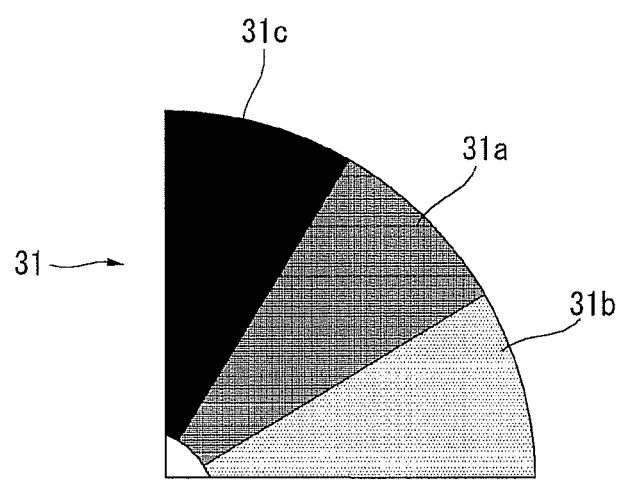

FIGS. 6 and 7 are enlarged views of the first control area 30 and the second control area 31.

Referring to FIG. 6, the first control area 30 can display a plurality of different colors 30a, 30b, 30c, 30d, 30e, 30f, 30g, 30h, 30i, 30j and 30k.

That is, the controller 180 can display the plurality of different colors 30a, 30b, 30c, 30d, 30e, 30f, 30g, 30h, 30i, 30j and 30k in the first control area 30 such that the colors are visually distinguished.

The plurality of different colors 30a, 30b, 30c, 30d, 30e, 30f, 30g, 30h, 30i, 30j and 30k may have the same size or different sizes.

In the following description, reference numerals 30a, 30b, 30c, 30d, 30e, 30f, 30g, 30h, 30i, 30j and 30k respectively denote first, second, third, fourth, fifth, sixth, seventh, eighth, ninth, tenth and eleventh colors.

The controller 180 can control display of the first control area 30 such that the plurality of different colors 30a, 30b, 30c, 30d, 30e, 30f, 30g, 30h, 30i, 30j and 30k respectively corresponding to the plurality of items 10, 11, 12, 13, 14, 15, 16, 17, 18, 19 and 20 displayed on the touch screen 151 are visually distinguished.

Referring to FIGS. 5 and 6, the first color 30a corresponds to the first item 10, the second color 30b corresponds to the item 11, the third color 30c corresponds to the third item 12, the fourth color 30d corresponds to the fourth item 13, the fifth item 30e corresponds to the fifth item 14, the sixth color 30f corresponds to the sixth item 15, the seventh color 30g corresponds to the seventh item 16, the eighth color 30h corresponds to the eighth item 17, the ninth color 30i corresponds to the ninth item 18, the tenth color 30j corresponds to the tenth item 19, and the eleventh color 30k corresponds to the eleventh item 20.

The second control area 31 may be divided into a plurality of sub-areas. Referring to FIG. 7, the second control area 31 can be divided into a first sub-area 31a, a second sub-area 31b and a third sub-area 31c. The method of dividing the second control area 31 into the plurality of sub-areas is not limited to the method shown in FIG. 7.

The controller 180 can set a specific sub-area from among the plurality of sub-areas as a touch area for executing an item selected through the first control area 30. For example, the first sub-area 31a can be set as the touch area for executing the selected item in FIG. 7.

The controller 180 can set separate functions for sub-areas other than the specific sub-area.

Referring to FIG. 7, a function of returning to a previous screen ("BACK") can be allocated to the second sub area 31b and a function of entering or returning to a home screen can be allocated to the third sub area 31c.

Functions allocated to the plurality of sub-areas included in the second control area 31 can be set in various manners and changed according to applications provided to the touch screen 151 and image types, which will be described below.

In addition, the controller 180 can display the plurality of items in colors respectively corresponding thereto when the first control area 30 and the second control area 31 are displayed on the touch screen 151.

The plurality of items may be displayed in colors respectively corresponding thereto in various manners.

Figure 8:
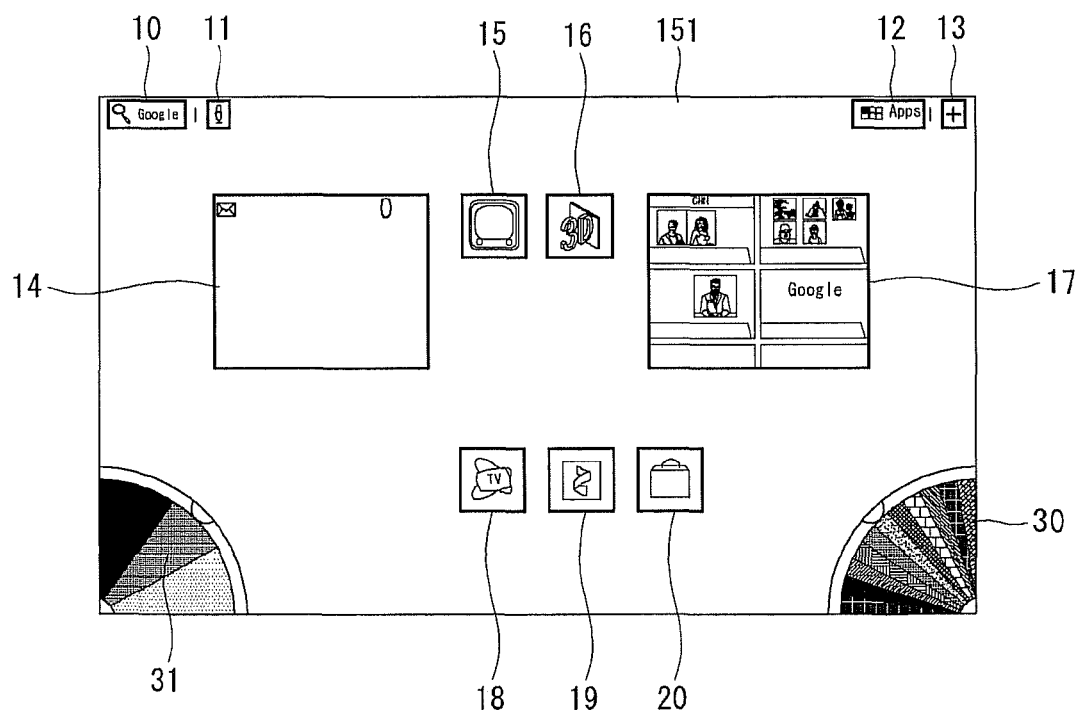

Referring to FIG. 8, the controller 180 can display the plurality of items with thick borders in colors respectively corresponding to the items such that the user can easily recognize the items respectively corresponding to the colors displayed in the first control area 30.

Figure 9:
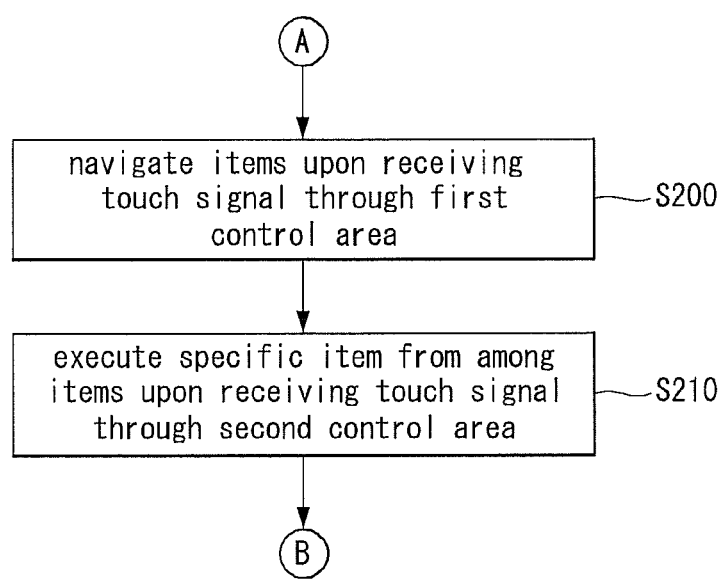
FIG. 9 is a flowchart illustrating a method of controlling an electronic device according to a second embodiment of the present invention.

FIG. 9 is a flowchart illustrating a method of controlling an electronic device according to a second embodiment of the present invention and FIGS. 10 to 15 are views for explaining the method of controlling an electronic device according to the second embodiment of the present invention.

The method of controlling an electronic device according to the second embodiment of the present invention and operations of the electronic device 100 to implement the method will now be described in detail with reference to the attached drawings. The second embodiment may be based on the above-described first embodiment.

Referring to FIG. 9, the controller 180 can navigate the plurality of items 10, 11, 12, 13, 14, 15, 16, 17, 18, 19 and 20 displayed on the touch screen 151 upon receiving a touch signal through the first control area 30 (S200).

That is, the user can select an item corresponding to a color displayed at a specific position of the first control area 30 from among the plurality of items 10, 11, 12, 13, 14, 15, 16, 17, 18, 19 and 20 by touching the specific position of the first control area 30 or pressing the specific position with predetermined intensity or more.

When one of the plurality of colors 30a, 30b, 30c, 30d, 30e, 30f, 30g, 30h, 30i, 30j and 30k is touched, the controller 180 can select an item corresponding to the touched color and visually emphasizes the selected item.

The selected item can be visually emphasized in various manners.

Figure 10:
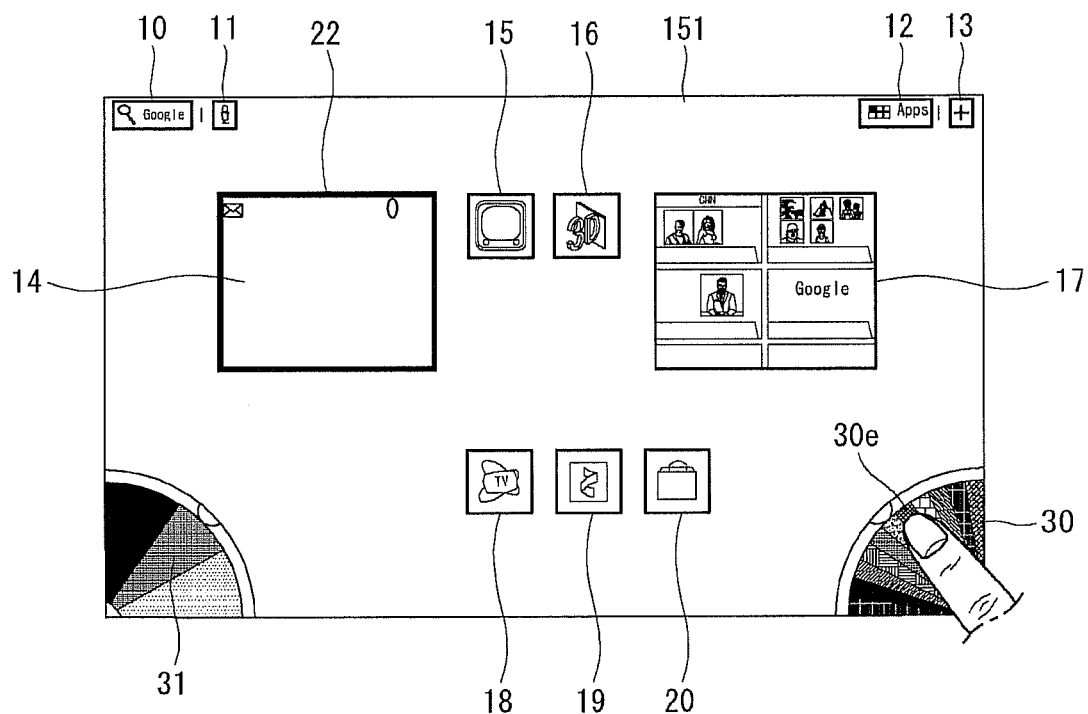
FIGS. 10 to 15 are views for explaining the method of controlling an electronic device according to the second embodiment of the present invention.

Referring to FIG. 10, when the user touches the fifth color 30e from among the plurality of colors 30a, 30b, 30c, 30d, 30e, 30f, 30g, 30h, 30i, 30j and 30k displayed in the first control area 30 with a finger, the controller 180 can select the fifth item 14 corresponding to the fifth color 30e and visually emphasize the fifth item 14 by highlighting the selected fifth item 14 using an indicator 22 having a thick border.

Figure 11:
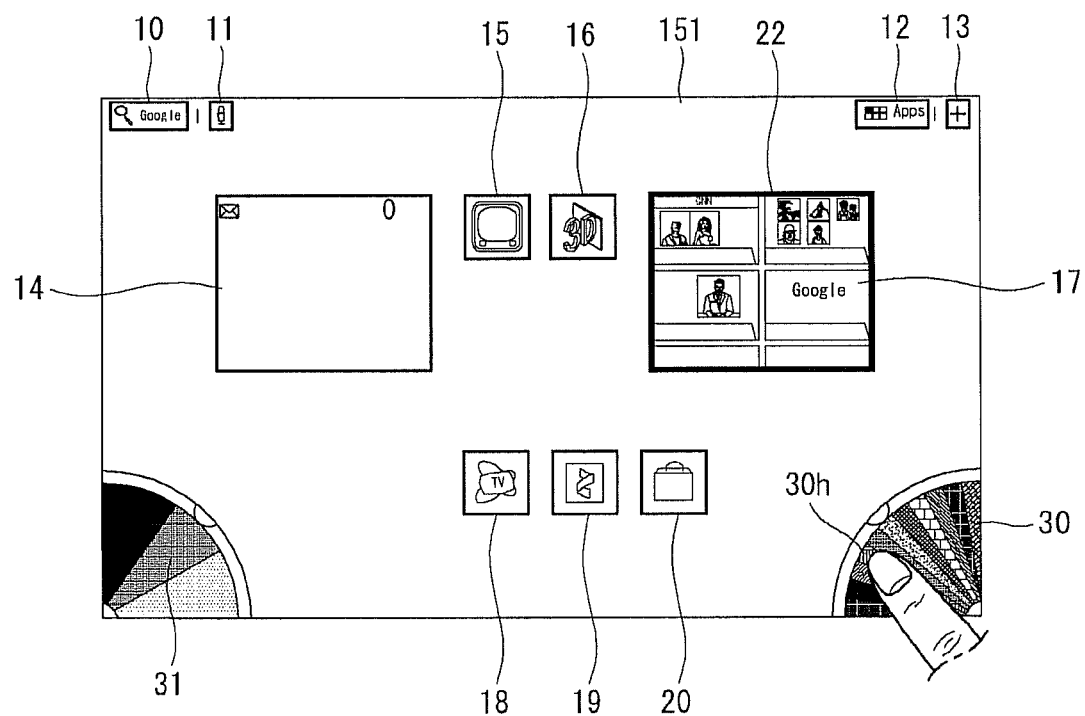

Referring to FIG. 11, when the user touches the eighth color 30h displayed in the first control area 30, the controller 180 can select the eighth item 17 corresponding to the eighth color 30h and visually emphasize the eighth item 17 by highlighting the selected eighth item 17 using the indicator 22.

The selected item can be visually emphasized in various manners in addition to the highlighting method using the indicator 22.

Figure 12:
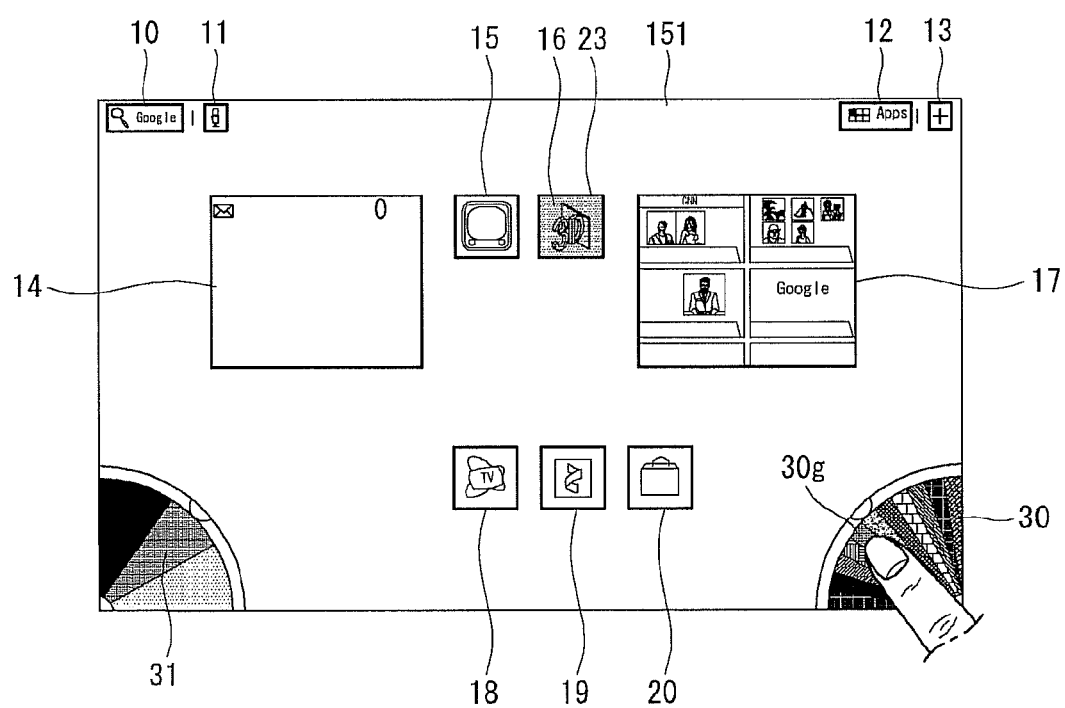

For example, referring to FIG. 12, when the user touches the seventh color 30g of the first control area 30, the controller 180 selects the seventh item 16 corresponding to the seventh color 30g.

In this case, the controller 180 can visually emphasize the seventh item 16 by overlaying a translucent object 23 corresponding to or larger than the seventh item 16 on the selected seventh item 16.

Figure 13:
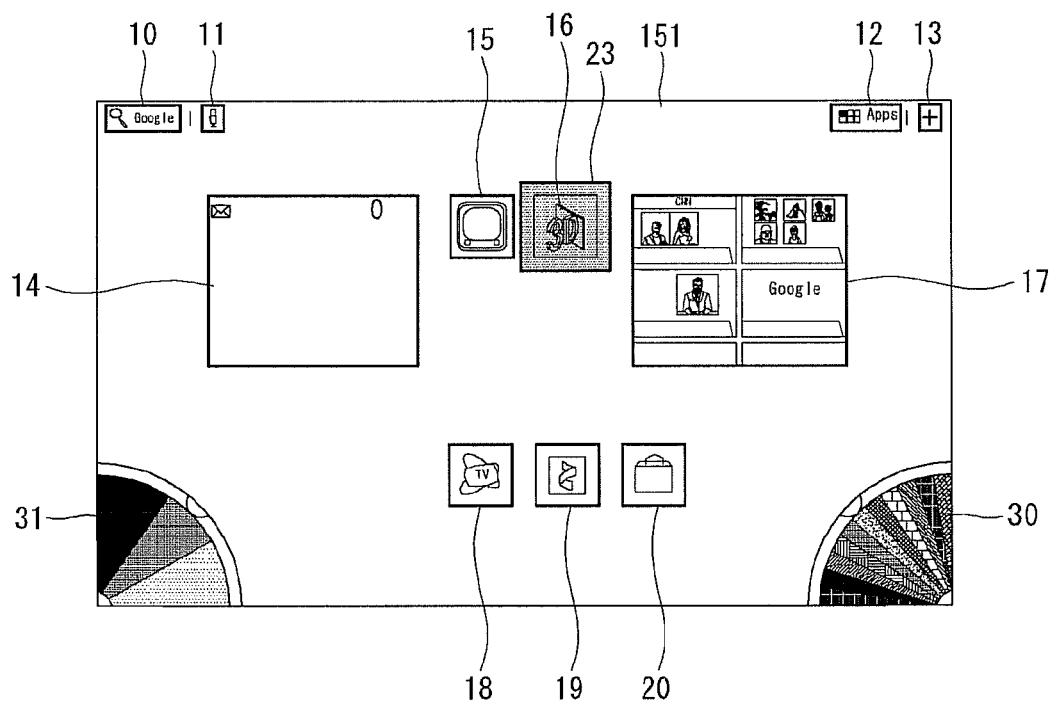

After the lapse of a predetermined time from when the user releases the finger touching the seventh color 30g from the first control area 30 in FIG. 12, the object 23 can disappear while being gradually enlarged, as shown in FIG. 13.

The controller 180 can respectively allocate identifiers to the plurality of colors 30a, 30b, 30c, 30d, 30e, 30f, 30g, 30h, 30i, 30j and 30k visually distinguished and displayed on the first control area 30 and the plurality of items 10, 11, 12, 13, 14, 15, 16, 17, 18, 19 and 20 corresponding to the colors.

Figure 14:
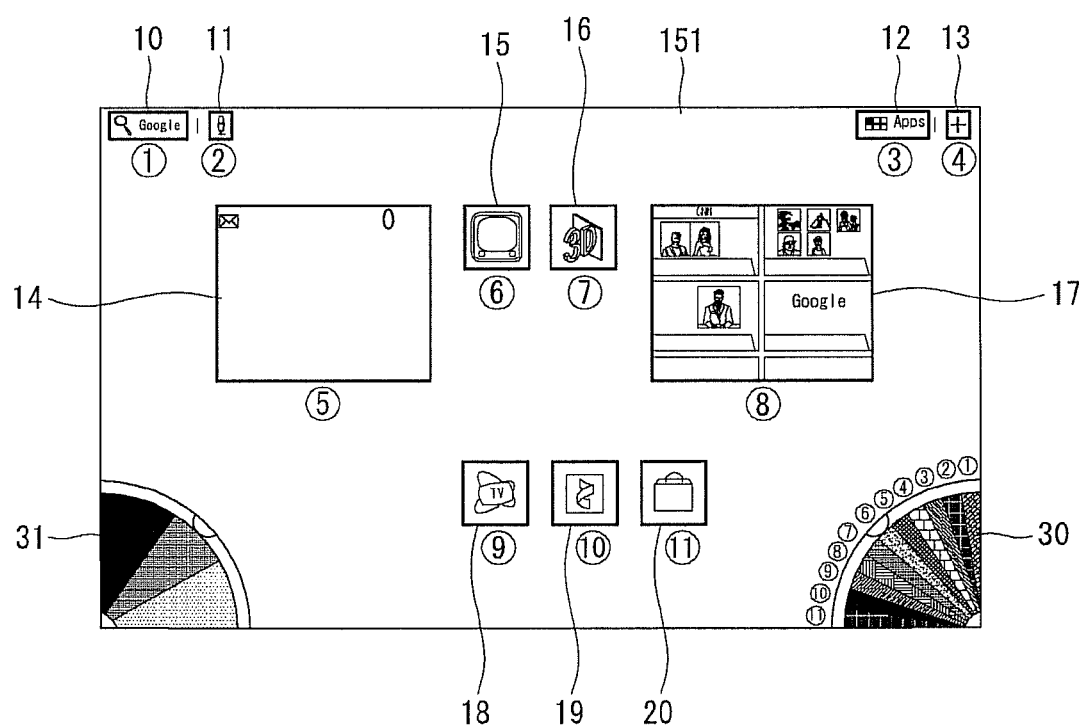

Referring to FIG. 14, the controller 180 can display identifiers corresponding to numerals 1 to 11 which are respectively allocated to the plurality of colors 30a, 30b, 30c, 30d, 30e, 30f, 30g, 30h, 30i, 30j and 30k. Furthermore, the controller 180 can indicate the items respectively corresponding to the plurality of colors 30a, 30b, 30c, 30d, 30e, 30f, 30g, 30h, 30i, 30j and 30k with the same numeral identifiers, as shown in FIG. 14.

The user can easily and rapidly recognize the relationship between the plurality of items 10, 11, 12, 13, 14, 15, 16, 17, 18, 19 and 20 and the plurality of colors 30a, 30b, 30c, 30d, 30e, 30f, 30g, 30h, 30i, 30j and 30k corresponding thereto through the identifiers shown in FIG. 14.

In addition, the controller 180 can execute a specific item from among the plurality of items displayed on the touch screen 151 when a touch signal is received through the second control area (S210).

Figure 15:
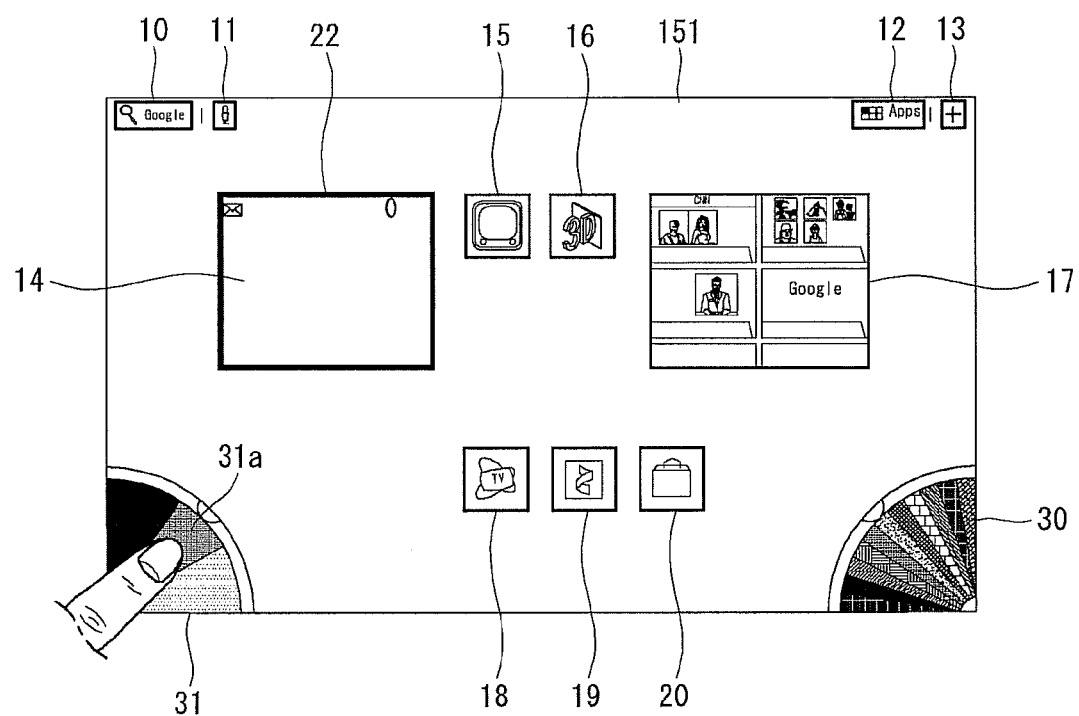

FIG. 15 shows an example of receiving a touch signal through the second control area.

Referring to FIG. 15, when the user touches the first sub-area 31a of the second control area 31 while the fifth item is selected through the first control area 30, the controller 180 can execute the selected fifth item.

Execution of the item in step S210 can be performed in various manners.

For example, when an item selected through the first control area 30 is an application, the controller 180 can execute the application and display a screen for executing the application in step S210.

If the item selected through the first control area 30 is multimedia data such as a picture, a moving picture or music, the controller 180 can execute an application (e.g. a still image viewer or a video or audio player) for playing the multimedia data and play the multimedia data in step S210.

Figure 16:
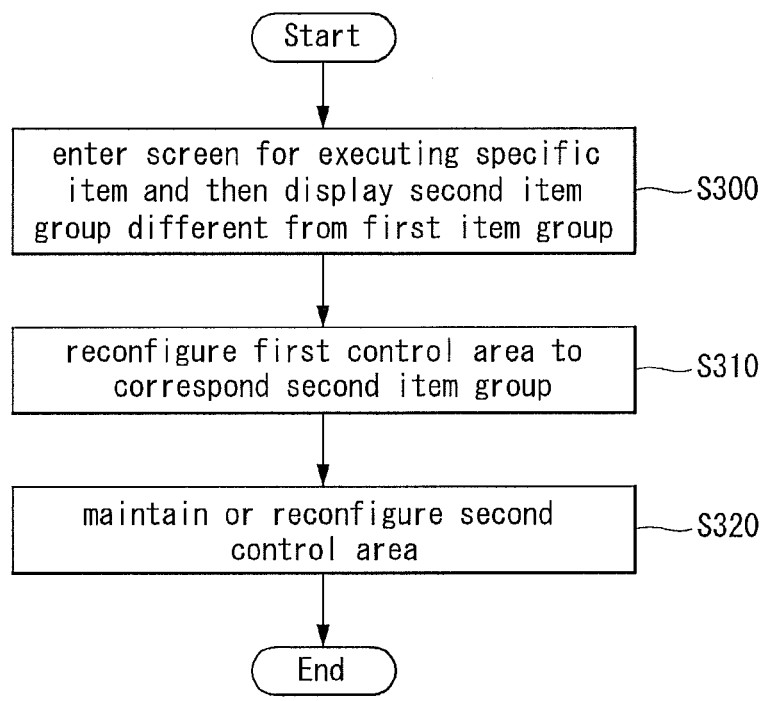
FIG. 16 is a flowchart illustrating a method of controlling an electronic device according to a third embodiment of the present invention.

FIG. 16 is a flowchart illustrating a method of controlling an electronic device according to a third embodiment of the present invention and FIGS. 17 to 21 are views for explaining the method of controlling an electronic device according to the third embodiment of the present invention.

The method of controlling an electronic device according to the third embodiment of the invention can be implemented in the electronic device 100 described above with reference to FIGS. 1 and 2. The method of controlling an electronic device according to the third embodiment of the invention and operations of the electronic device 100 to implement the method will now be described with reference to the attached drawings. The third embodiment of the present invention can be based on the above-described first and second embodiments of the invention.

Referring to FIG. 16, after the screen for executing the selected specific item is displayed in step S210 of the second embodiment, the controller 180 may display a second item group different from the first item group described in the first embodiment on the touch screen 151 (S300).

The second item group includes a plurality of items as does the first item group. However, the second item group includes items different from the items included in the first item group.

That is, the screen for executing the selected item can display a plurality of selectable items different from the first item group that has been displayed on the touch screen 151 before the screen is displayed.

Figure 17:
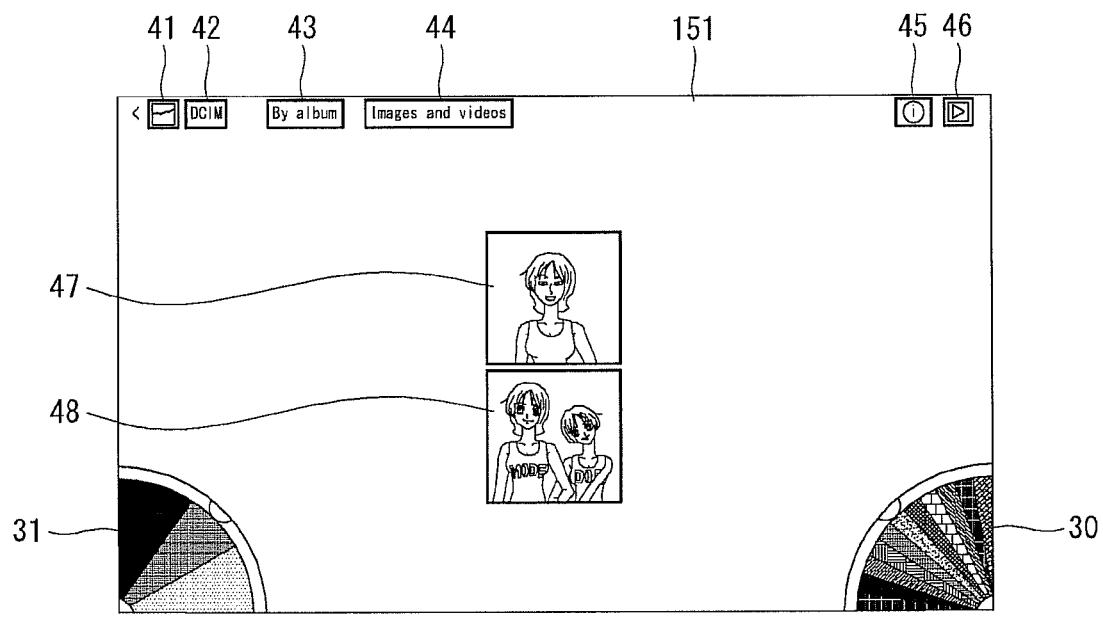
FIGS. 17 to 21 are views for explaining the method of controlling an electronic device according to the third embodiment of the present invention.

FIG. 17 shows another example of the above-described first embodiment of the present invention. The controller 180 can display a plurality of items 41, 42, 43, 44, 45, 46, 47 and 48 as the first item group on the touch screen 151, as shown in FIG. 17.

The controller 180 can display the first and second control areas 30 and 31 on the touch screen 151 upon receiving the predetermined first command.

Figure 18:
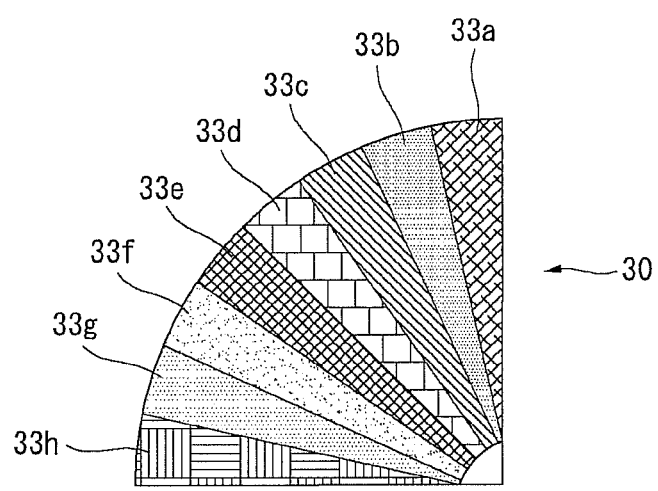

FIG. 18 illustrates the relationship between the first control area 30 and the plurality of items 41, 42, 43, 44, 45, 46, 47 and 48 corresponding thereto.

Referring to FIG. 18, the controller 180 divides the first control area 30 into 8 regions respectively corresponding to the plurality of items 41, 42, 43, 44, 45, 46, 47 and 48 and displays the 8 regions in different colors 33a, 33b, 33c, 33d, 33e, 33f, 33g and 33h.

The controller 180 respectively matches the plurality of colors 33a, 33b, 33c, 33d, 33e, 33f, 33g and 33h to the plurality of items 41, 42, 43, 44, 45, 46, 47 and 48.

The user can select the specific image 47 from the plurality of items 41, 42, 43, 44, 45, 46, 47 and 48 and execute the specific image 47 by respectively controlling the first and second control areas 30 and 31 as described above in the first embodiment of the invention.

Referring to FIGS. 17 and 18, the user can select the specific image 47 by touching the specific color 33g of the first control area 30, which corresponds to the specific image 47, and then execute the image 47 by touching the second control area 31.

Figure 19:
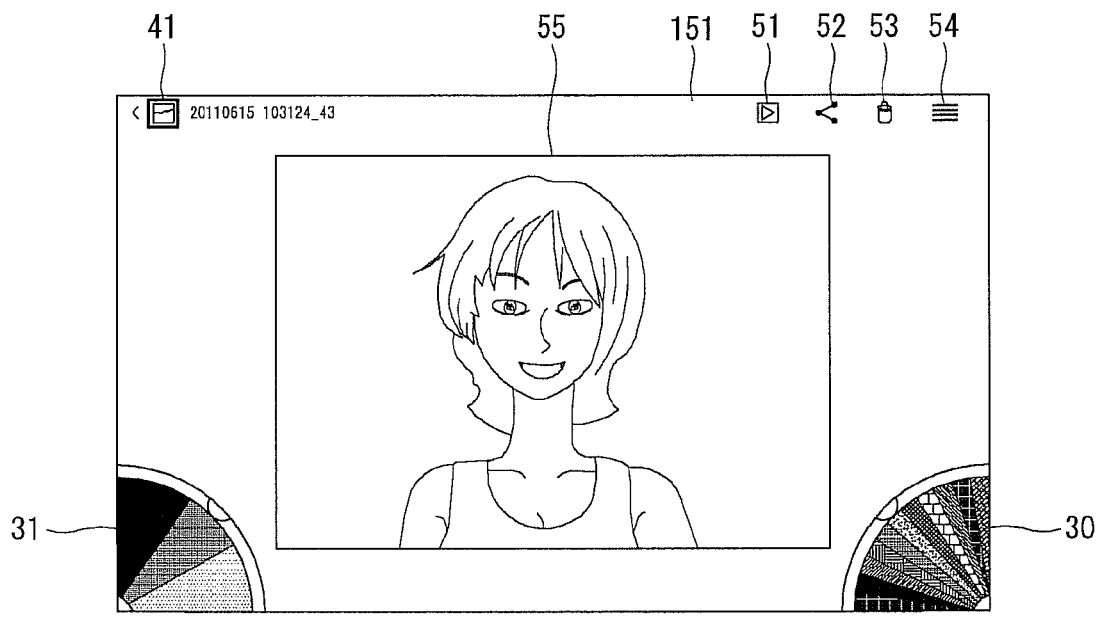

FIG. 19 shows an exemplary screen on which an image viewer is executed according to selection and execution of the image 47.

Referring to FIG. 19, the controller 180 can display a plurality of selectable items 41, 51, 52, 54, 54 and 55 as the second item group different from the first item group on the touch screen 151 (S300).

The controller 180 can reconfigure the first control area 30 such that the first control area 30 corresponds to the second item group upon display of the screen on which the selected item is executed (S310).

Figure 20:
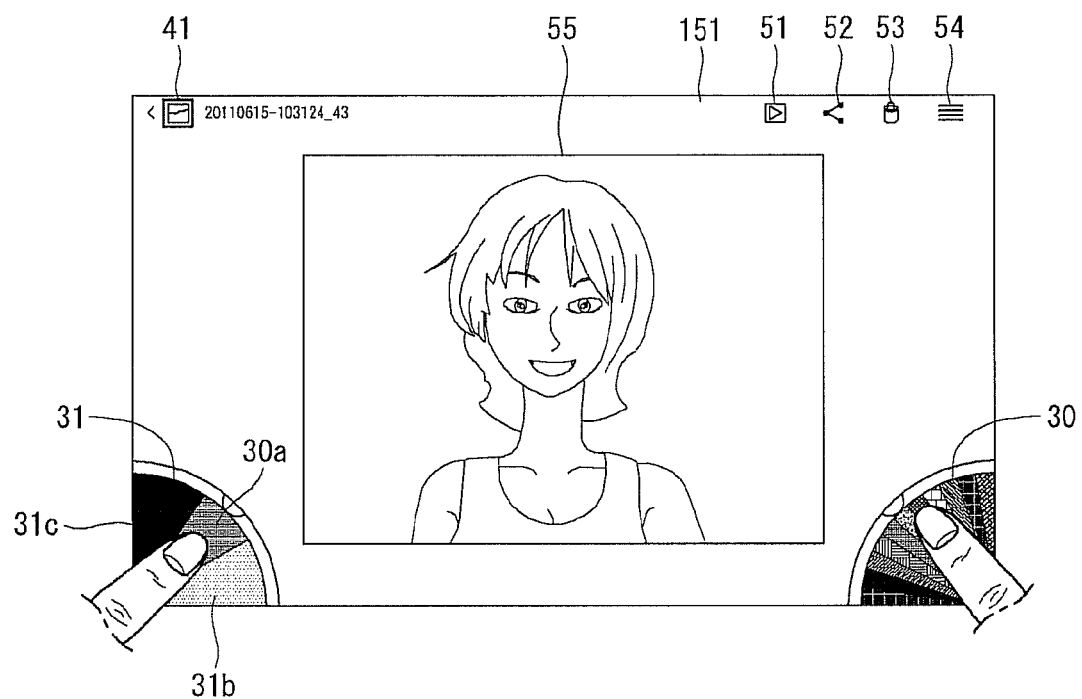

For example, the controller 180 can provide the first and second control areas 30, 31 to the touch screen 151, as shown in FIG. 20, when the predetermined first command for activating the first and second control areas 30 and 31 is received.

Figure 21:
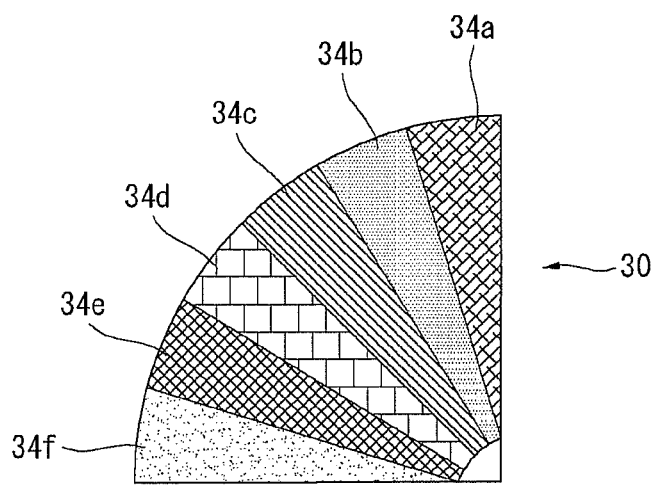

Here, the first control area 30 shown in FIG. 20 is reconfigured such that it has colors which are different from those of FIGS. 17 and 18 and respectively correspond to the second item group 41, 51, 52, 543, 54 and 55, as shown in FIG. 21.

Referring to FIG. 21, the controller 180 divides the first control area 30 into 6 regions respectively corresponding to the plurality of items 41, 51, 52, 53, 54 and 55 included in the second item group and displays the 6 regions in different colors 34a, 34b, 34c, 34d, 34e and 34f.

The controller 180 respectively matches the plurality of items 41, 51, 52, 53, 54 and 55 to the plurality of colors 34a, 34b, 34c, 34d, 34e and 34f.

In addition, the controller 180 can maintain or reconfigure the second control area 31 when the screen for executing the selected item is displayed (S320).

Referring to FIG. 20, a function of executing an item selected from the plurality of items 41, 51, 52, 53, 54 and 55 through the first control area 30 may correspond to the first sub-area 31a of the second control area 31, a function of displaying a previous image on the touch screen 151 may correspond to the second sub-area 31b, and a function of displaying a next image on the touch screen 151 may correspond to the third sub-area 31c.

Here, when the screen of FIG. 19 is displayed, the controller 180 can provide information for showing the functions allocated to the second control area 31, described above with reference to FIG. 20, to the touch screen 151 in various manners.

For example, the controller 180 can display a speech bubble showing phrases that represent the functions allocated to the second control area 31 such that the speech bubble corresponds to the second control area 31 for a moment and then make the speech bubble disappear.

The functions allocated to the sub-areas 31a, 31b and 31c (the number of sub-areas is not limited to 3) of the second control area 31 may vary according to the current state of the mobile terminal 100 or the screen currently displayed on the touch screen 151, as described above. Particularly, the functions can vary according to a currently enabled application.

For example, if the currently executed or enabled application is a web browser, the function of executing an item selected through the first control area 30 can be allocated to the first sub-area 31a, a function of displaying a previous webpage on the touch screen 151 can be allocated to the second sub-area 31b, and a function of displaying a next webpage on the touch screen 151 can be allocated to the third sub-area 31.

If the currently executed or enabled application is an audio player, the function of executing an item selected through the first control area 30 can be allocated to the first sub-area 31a, a function of calling and reproducing a previous audio file can be allocated to the second sub-area 31b, and a function of calling and reproducing a next audio file can be allocated to the third sub-area 31c.

Figure 22:
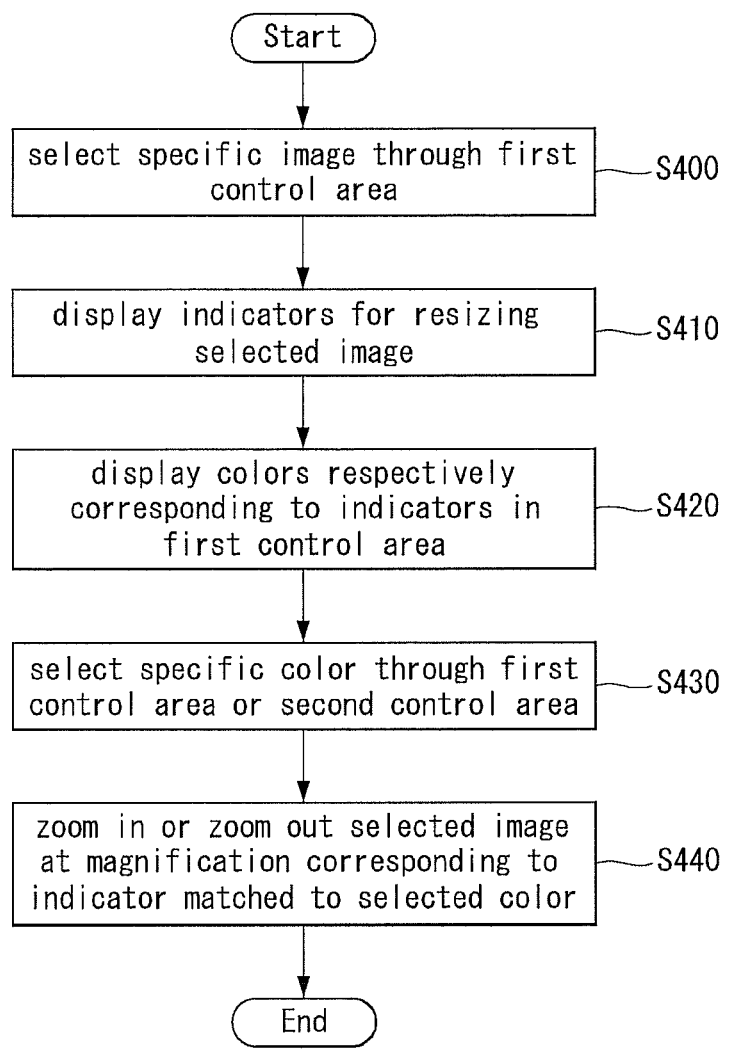
FIG. 22 is a flowchart illustrating a method of controlling an electronic device according to a fourth embodiment of the present invention.

FIG. 22 is a flowchart illustrating a method of controlling an electronic device according to a fourth embodiment of the present invention and FIGS. 23 to 26 are views for explaining the method of controlling an electronic device according to the fourth embodiment of the present invention.

The method of controlling an electronic device according to the fourth embodiment of the invention can be implemented in the electronic device 100 described above with reference to FIGS. 1 and 2. The method of controlling an electronic device according to the fourth embodiment of the invention and operations of the electronic device 100 to implement the method will now be described with reference to the attached drawings. The fourth embodiment of the present invention can be based on the above-described first, second and/or third embodiments of the invention.

Referring to FIG. 22, the controller 180 can select a specific image through the first control area 30 according to the above-described embodiments (S400).

For example, the user can select the specific image 55 through the first control area 30 according to the third embodiment of the present invention. Otherwise, the controller 180 may select the specific image 55 when a touch signal is received through the first sub-area 31a of the second control area 31.

Upon selection of the specific image 55, the controller 180 can display a plurality of indicators for resizing the selected image on the touch screen 151 (S410).

Figure 23:
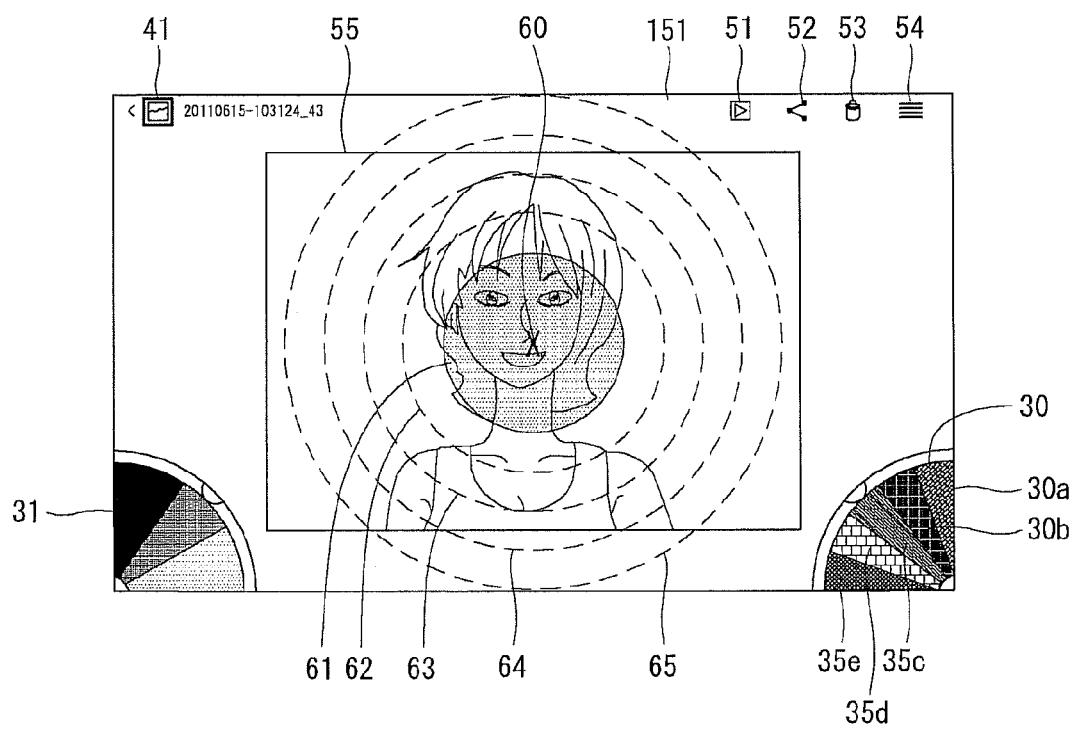
FIGS. 23 to 26 are views for explaining the method of controlling an electronic device according to the fourth embodiment of the present invention.

FIG. 23 shows an exemplary screen on which the plurality of indicators is displayed.

Referring to FIG. 23, when the specific image 55 is selected, the controller 180 can display a focal point 60 at the center of the specific image 55 and display a plurality of concentric circles 61, 62, 63, 64 and 65 having the focal point 60 as a central point on the touch screen 151. Here, the controller 180 can display the concentric circles 61, 62, 63, 64 and 65 translucently.

The concentric circles 61, 62, 63, 64 and 65 shown in FIG. 23 correspond to the plurality of indicators for resizing the selected image. Resizing the selected image means zooming in or zooming out the selected image.

Predetermined magnifications correspond to the plurality of concentric circles 61, 62, 63, 64 and 65. For example, 1.0 magnification, 1.2 magnification, 1.5 magnification, 1.8 magnification and 2.0 magnification may respectively correspond to the first, second, third, fourth and fifth concentric circles 61, 62, 63, 64 and 65.

The controller 180 can display a plurality of different colors respectively corresponding to the plurality of indicators in the first control area 30 (S420).

FIG. 23 shows that the colors 35a, 35b, 35c, 35d and 35e are displayed in the first control area 30.

The plurality of different colors 35a, 35b, 35c, 35d and 35e may respectively correspond to the plurality of concentric circles 61, 62, 63, 64 and 65.

In this case, the controller 180 can respectively display the concentric circles 61, 62, 63, 64 and 65 in the plurality of colors 35a, 35b, 35c, 35d and 35e of the first control area 30.

That is, the plurality of concentric circles 61, 62, 63, 64 and 65 can be displayed in colors corresponding to the relationship between the concentric circles and the colors 35a, 35b, 35c, 35d and 35e of the first control area 30.

The controller 180 can receive a signal for selecting a specific color from the plurality of colors 35a, 35b, 35c, 35d and 35e through the first control area 30 or the second control area 31 from the user (S430).

Figure 24:
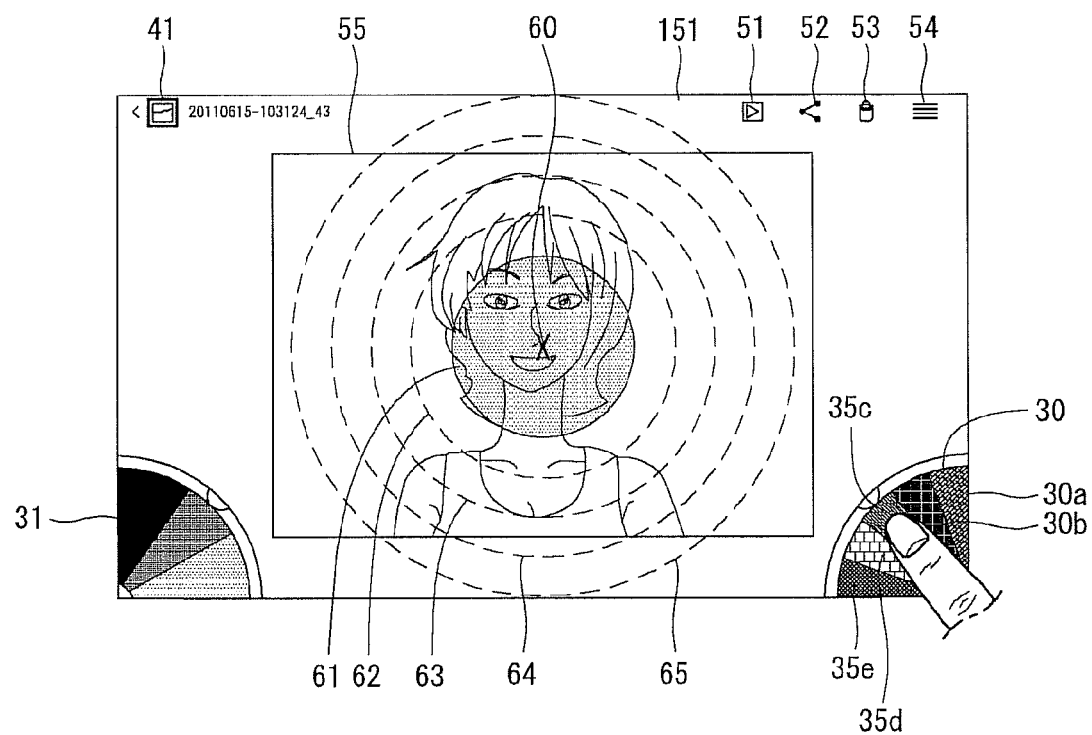

Referring to FIG. 24, the user can touch the specific color 35c from among the plurality of colors 35a, 35b, 35c, 35d and 35e.

The controller 180 can resize the specific image by zooming in or zooming out the specific image at a magnification corresponding to an indicator matched to the selected specific color (S440).

Figure 25:
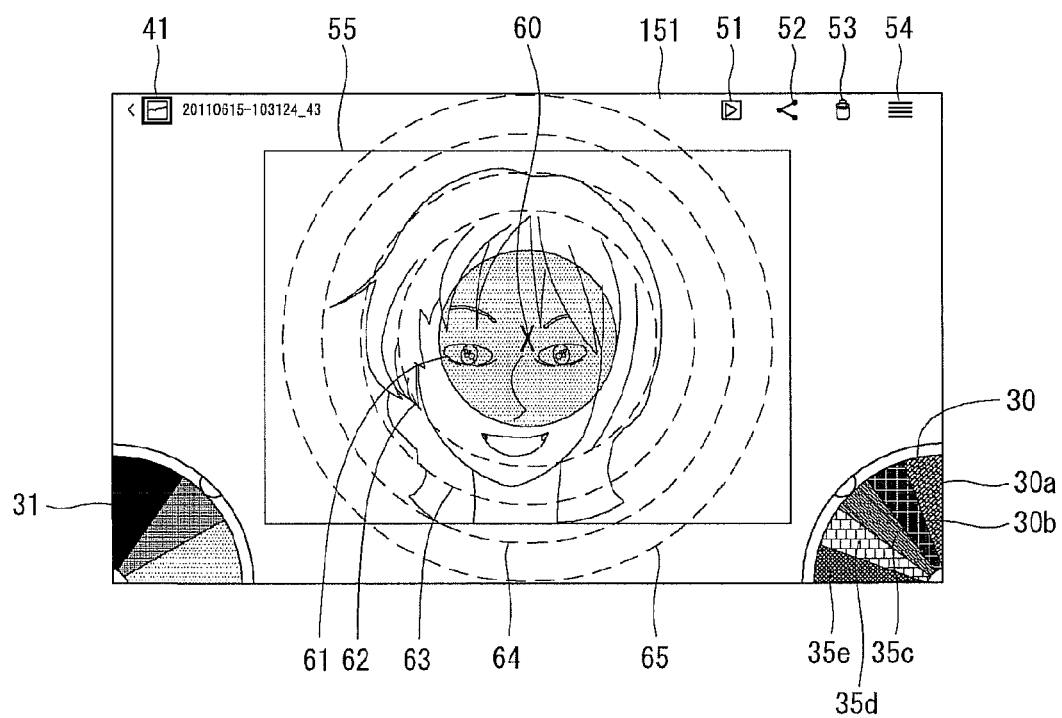

In FIG. 24, the selected specific color 35c corresponds to the third concentric circle 63 having a magnification of 1.5. Accordingly, the controller 180 can magnify the specific image 55 by a factor of 1.5 corresponding to the specific color 35c. FIG. 25 shows the specific image 55 that has been magnified by a factor of 1.5.

In the present embodiment, the second control area 31 may be allocated various functions. For example, the selection (or execution) function, the previous image view function and the next image view function can be allocated to the second control area 31 as described in the above embodiments.

Figure 26:
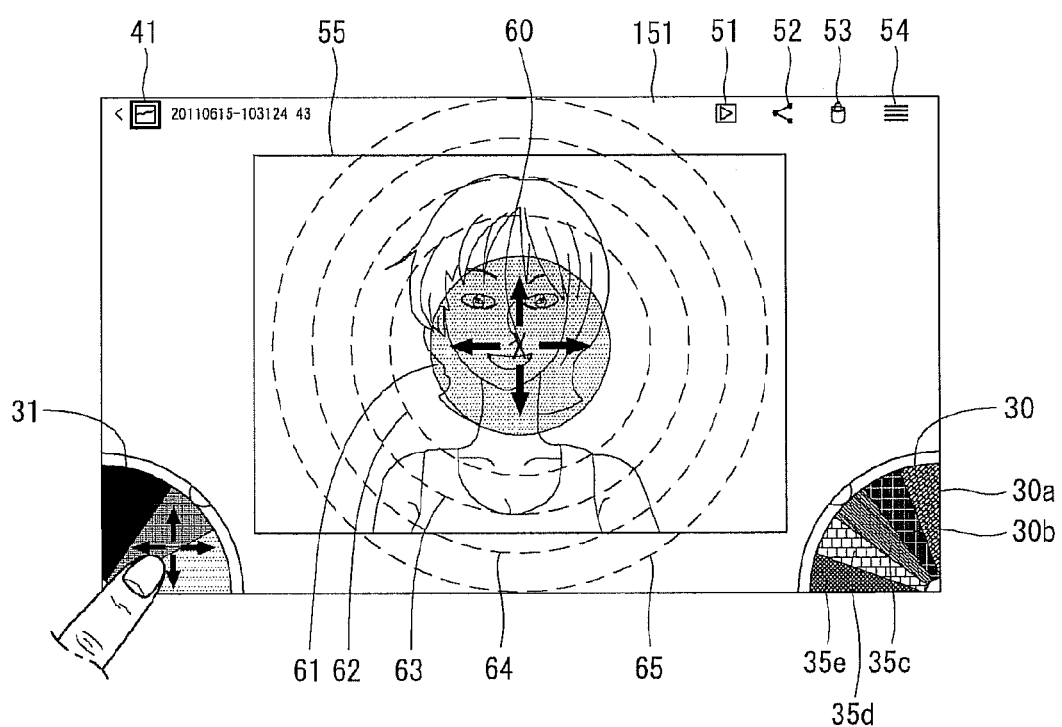

Furthermore, a function of moving the focal point 60 can be allocated to the second control area 31. FIG. 26 is a view for explaining allocation of the function of moving the focal point 60 to the second control area 31.

Referring to FIG. 26, when the user touches the second control area 31 with a finger and moves the touch, the controller 180 can move the focal point 60 in the touch moving direction.

The user can move the focal point 60 to a desired point through the second control area 31, and then zoom in or zoom out the specific image 55 with the focal point 60 as its center through the first control area 30, as described above.

Figure 27:
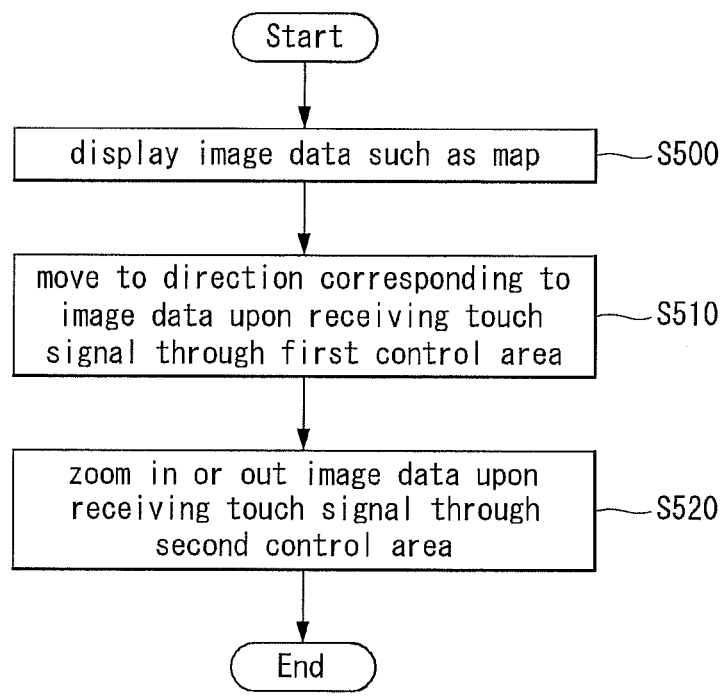
FIG. 27 is a flowchart illustrating a method of controlling an electronic device according to a fifth embodiment of the present invention.
Figure 28:
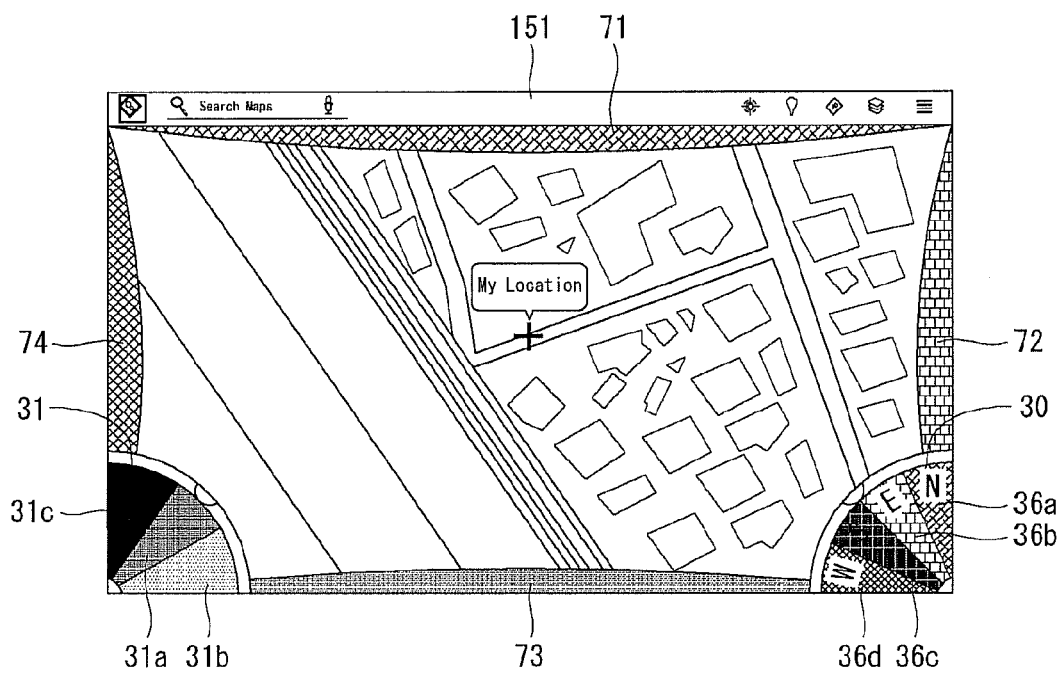
FIG. 28 is a view for explaining the method of controlling an electronic device according to the fifth embodiment of the present invention.

FIG. 27 is a flowchart illustrating a method of controlling an electronic device according to a fifth embodiment of the present invention and FIG. 28 is a view for explaining the method of controlling an electronic device according to the fifth embodiment of the present invention.

The method of controlling an electronic device according to the fifth embodiment of the invention can be implemented in the electronic device 100 described above with reference to FIGS. 1 and 2. The method of controlling an electronic device according to the fifth embodiment of the invention and operations of the electronic device 100 to implement the method will now be described with reference to the attached drawings. The fifth embodiment of the present invention can be based on the above-described first, second and/or third embodiments of the invention.

Referring to FIG. 27, the controller 180 can display image data such as a map on the touch screen 151 (S500).

FIG. 28 shows an exemplary map displayed on the touch screen 151 as the image data.

The controller 180 may display the first and second control areas 30 and 31 on the touch screen 151 at the same time when the image data is displayed on the touch screen 151, or display the first and second control areas 30 and 31 on the touch screen 151 upon receiving the predetermined first command, as described in the above embodiments.

When a touch signal is received through the first control area 30, the controller 180 can move the image data to the direction corresponding to the received touch signal (S510). When a touch signal is received through the second control area 31, the controller 180 can resize the image data by zooming in or zooming out the image data.

Referring to FIG. 28, the controller 180 can display four direction items 71, 72, 73 and 74 on the touch screen 151 as the plurality of items described in the first embodiment.

The four direction items 71, 72, 73 and 74 are referred to as the first direction item 71, the second direction item 72, the third direction item 73 and the fourth direction item 74.

The first direction item 71 may correspond to north N, the second direction item may correspond to east E, the third direction item 73 may correspond to south S, and the fourth direction item may correspond to west W.

The controller 180 can display the plurality of colors 36a, 36b, 36c and 36d respectively corresponding to the first to fourth direction items 71, 72, 73 and 74 in the first control area 30.

Here, the first to fourth direction items 71, 72, 73 and 74 can be displayed in the colors corresponding thereto, displayed in the first control area 30.

Accordingly, the plurality of colors 36a, 36b, 36c and 36d can respectively correspond to north N, east E, south S and west W.

For example, when the user touches the color 36a corresponding to north N from among the plurality colors in FIG. 28, the controller 180 can move the map shown in FIG. 28 north.

Moving the map north means scrolling the map to display the northern area which is not displayed.

In this manner, when the user touches the first control area 30, the controller 180 can move or scroll the image data such as a map to the direction corresponding to the touched point.

That is, the user can move or scroll the image data such as a map displayed on the touch screen 151 using the relationship between the four direction items 71, 72, 73 and 74 respectively corresponding to different directions and the plurality of colors 36a, 36b, 36c and 36d.

While FIG. 28 shows letters N, E, S and W indicating directions, displayed in the first control area 30, the letters N, E, S and W may not be displayed. That is, the user can easily recognize a desired image data moving/scrolling direction using the relationship between the colors and the direction items.

North, east, south and west are sequentially matched to the colors 36a, 36b, 36c and 36d displayed in the first control area 30 because the controller 180 can move the screen while naturally drawing a circle clockwise when the user drags the color 36a to the color 36d.

However, the directions may be matched to the colors 36a, 36b, 36c and 36d in a manner different from the above manner.

Furthermore, in FIG. 28, a touch signal is received through the first sub-area 31a of the second control area 31, the controller 180 can select an item currently indicated by an item indicator 70 or display information about the selected item on the touch screen 151 at the same time when the item is selected.

In addition, the controller 180 can respectively allocate a zoom-in function and a zoom-out function to the second sub-area 31b and the third sub-area 31c of the second control area 31 in FIG. 28.

While the first control area 30 and the second control area 31 are respectively located at the bottom left and right corners of the touch screen 151 in the above-described embodiments, the technical spirit of the present invention is not limited thereto.

Figure 29:
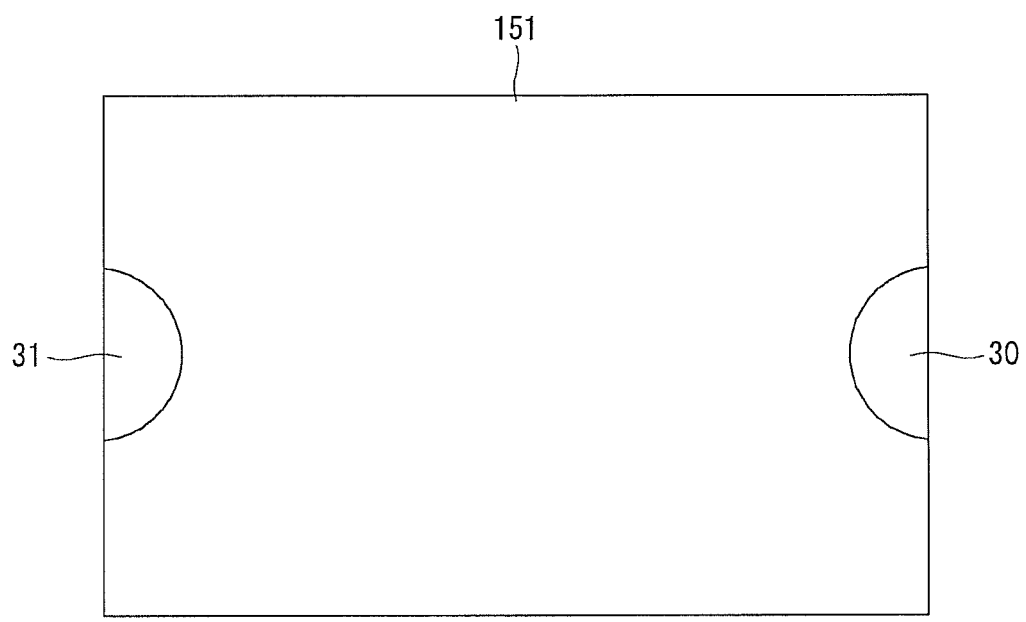
FIGS. 29 and 30 are views for illustrating a first control area 30 and a second control area 31 that can be provided to different positions.
Figure 30:
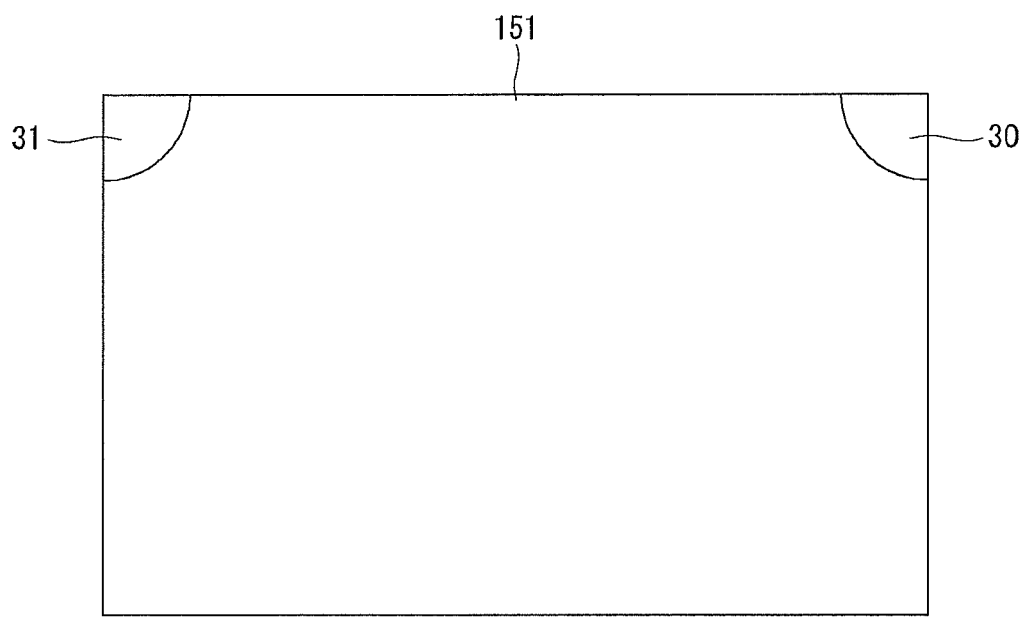

FIGS. 29 and 30 show that the first control area 30 and the second control area 31 are located at different positions.

Referring to FIG. 29, the controller 180 can respectively locate the first control area 30 and the second control area 31 at the centers of the right edge and the left edge of the touch screen 151.

Referring to FIG. 30, the controller 180 can respectively locate the first control area 30 and the second control area 31 at the top right and left corners of the touch screen 151.

Figure 31:
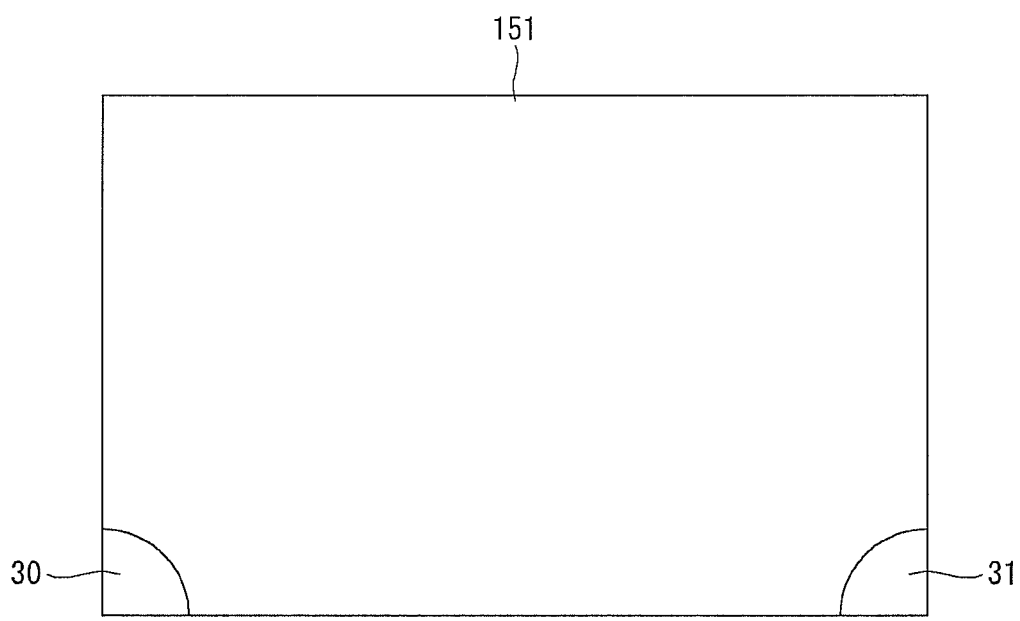
FIG. 31 is a view for illustrating location of the first control area 30 and the second control area 31.

FIG. 31 is a view for explaining location of the first control area 30 and the second control area 31.

For example, the controller 180 can provide the first control area 30 to the left side of the touch screen 151 and provide the second control area 31 to the right side of the touch screen 151, as shown in FIG. 31.

The controller 180 can simultaneously receive two touch signals from the user as the predetermined first command for activating the first and second control areas 30 and 31, which has been described above.

In this case, when the user simultaneously touches arbitrary two points with two fingers, the controller 180 can provide the first and second control areas 30 and 31 to the two points.

Figure 32:
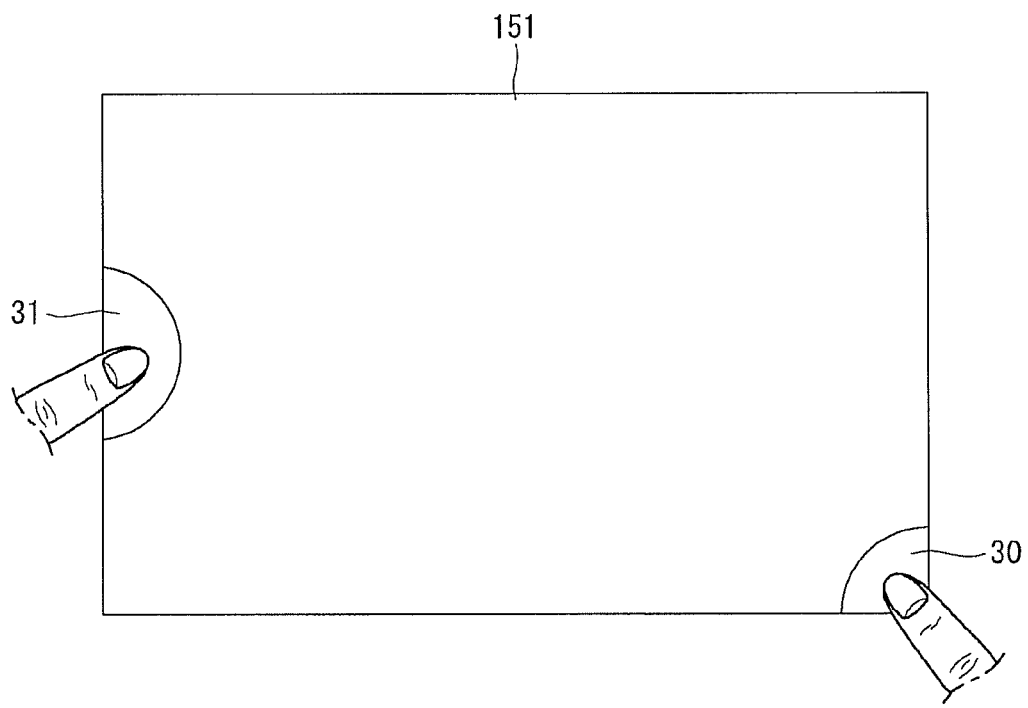
FIG. 32 is a view for illustrating an example of providing the first and second control areas 30 and 31 to arbitrary two points touched by a user.

FIG. 32 illustrates an example of providing the first and second control areas 30 and 31 to arbitrary two points touched by the user.

Referring to FIG. 32, when the user simultaneously touches the center of the left edge of the touch screen 151 and the bottom right corner of the touch screen 151, the controller 180 can provide the first control area 30 to the bottom right corner of the touch screen 151 and provide the second control area 31 to the center of the left edge of the touch screen 151.

As described above, the positions and shapes of the first and second control areas 30 and 31 may be set by the user or set and changed by a command received from the user.

As described above, the first control area 30 and the second control area 31 can be used to select, execute or control a plurality items displayed on the touch screen 151 by combining functions thereof in various manners.

In addition to the above-described embodiments, the functions of the first and second control areas 30 and 31 can be combined in various manners, which will now be described.

For example, the user can select a specific item from the plurality of items displayed on the touch screen 151 through the first control area 30 and zoom in or zoom out the specific item through the second control area 31.

The user can scroll information displayed on the touch screen 151 through the first control area 30 up and down, move to a next page or a previous page through the second control area 31, or exit a currently activated application.

Furthermore, the first control area 30 and the second control area 31 may complement each other when performing the same function.

For example, the user can increase or decrease the size of a copy region by selecting the starting point or starting portion of the copy region using a finger through the first control area 30 and moving the finger through the control area 30 while pressing the second control area 31.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
   a touch screen configured to display a first item group that includes a first plurality of items, wherein the first item group includes all items on the entire touch screen that can be selected; and
   a controller configured to:
      receive touch input on two different regions of the touch screen, wherein the two different regions correspond to edges or corners on the touch screen, and
      control the touch screen to provide a first control area and a second control area, the first control area to display a first plurality of colors, each color corresponding to a different one of the first plurality of items, the second control area for executing an item of the first plurality of items displayed on the touch screen in response to the touch input, wherein the two different regions are regions in which the first control area and the second control area are displayed,
      wherein in response to a touch received at the first control area, the controller is further configured to navigate among the first plurality of items displayed on the touch screen based on a relationship between the first plurality of items and the first plurality of colors, and
      in response to a touch at the second control area, the controller is further configured to execute a selected item of the first plurality of items;
   wherein the controller is configured to:
      display a screen for executing the selected item on the touch screen, the displayed screen including the first plurality of items;
      in response to selection of one of the first plurality of items displayed on the screen, display, on the screen, a second item group that is different from the first item group displayed on the screen;
      control the touch screen to configure the first control area to display a second plurality of colors, such that the reconfigured first control area corresponds to the second item group displayed on the screen; and
      reconfigure the second control area to correspond the second item group displayed on the screen, and display a speech bubble showing information relating to functions of the reconfigured second control area.

2. The electronic device of claim 1, wherein the controller activates the first control area and the second control area in response to the electronic device receiving a first command, and the controller to deactivate the first control area and the second control area in response to the electronic device re-receiving the first command or receiving a second command that is different from the first command.

3. The electronic device of claim 1, wherein the controller displays the first plurality of colors such that the colors are visually distinguished from each other.

4. The electronic device of claim 3, wherein in response to receiving a touch to a specific color of the first plurality of colors, the controller selects an item corresponding to the touched specific color and visually emphasizes the selected item.

5. The electronic device of claim 4, wherein the controller displays a visual indicator with regard to the selected item.

6. The electronic device of claim 4, wherein the controller displays the second control area as a plurality of sub-areas, sets a first sub-area of the plurality of sub-areas as a touch area for executing the selected item, and allocates at least one function to a second sub-area of the plurality of sub-areas.

7. The electronic device of claim 6, wherein in response to a touch at the first control area, the controller navigates among the second plurality of items based on a relationship between the second plurality of items and the second plurality of colors.

8. The electronic device of claim 7, wherein the controller maintains functions allocated to the sub-areas of the second control area when the screen for executing the selected item is displayed.

9. The electronic device of claim 7, wherein the controller allocates at least one new function to at least one sub-area of the second control area when the screen for executing the selected item is displayed.

10. A method of controlling a mobile terminal that includes a touch screen, the method comprising:
   displaying, on the touch screen, a first item group that includes a first plurality of items, wherein the first item group includes all items on the entire touch screen that can be selected;
   receiving touch input on two different regions of the touch screen, wherein the two different regions correspond to edges or corners on the touch screen;
   providing a first control area and a second control area on the touch screen, the first control area displaying a first plurality of colors, each color corresponding to a different one of the first plurality of items, the second control area for executing an item of the first plurality of items displayed on the touch screen in response to the touch input, wherein the two different regions are regions in which the first control area and the second control area are displayed;
   navigating among the first plurality of items displayed on the touch screen based on a relationship between the first plurality of items and the first plurality of colors in response to a touch received at the first control area; and executing a specific item of the first plurality of items in response to a touch received at the second control area; wherein the method further comprising:

in response to selection of one of the first plurality of items displayed on the screen, displaying, on the screen, a second item group that is different from the first item group displayed on the screen;

reconfiguring the first control area to display a second plurality of colors, such that the reconfigured first control area corresponds to the second item group displayed on the screen; and reconfiguring the second control area to correspond to the second item group displayed on the screen, and displaying a speech bubble showing information relating to functions of the reconfigured second control area.

11. The method of claim 10, wherein providing the first control area and the second control area is performed in response to the electronic device receiving a first command, and the method further comprises deactivating the first control area and the second control in response to the electronic device re-receiving the first command or receiving a second command that is different from the first command.

12. The method of claim 10, wherein providing the first control area and the second control area comprises displaying the first plurality of colors in the first control area such that the colors are visually distinguished from each other.

13. The method of claim 12, further comprising in response to receiving a touch to a specific color, selecting an item corresponding to the touched specific color and visually emphasizing the selected item.

14. The method of claim 13, further comprising displaying a visual indicator with regard to the selected item.

15. The method of claim 13, further comprising displaying the second control area as a plurality of sub-areas, setting a first sub-area of the plurality of sub-areas as a touch area for executing the selected item, and allocating at least one function to a second one of the plurality of sub-areas.

16. The method of claim 15, further comprising
navigating among the second plurality of items based on a relationship between the second plurality of items and the second plurality of colors in response to touches received at the first control area.

17. The method of claim 16, further comprising maintaining functions allocated to the sub-areas of the second control area when the screen for executing the selected item is displayed.

18. The method of claim 16, further comprising allocating a new function to at least one sub-area of the second control area when the screen for executing the selected item is displayed.

19. An electronic device comprising:
a screen to display a plurality of items, the screen to receive touch inputs, wherein the plurality of items includes all items that can be selected; and
a controller to control the screen to display a first control area and a second control area, the first control area to include a plurality of different color indicators, wherein each color indicator of the first control area visually corresponds to a different one of the plurality of items displayed on the screen, the second control area including a plurality of sub-areas, each corresponding to a different function, wherein the two different regions are regions in which the first control area and the second control area are displayed, wherein the two different regions correspond to edges or corners on the screen,
wherein the controller to select one of the plurality of items based on a touch input at the first control area, and the controller to perform a specific function based on a touch input at the second control area;
wherein the controller is configured to:
display a screen for executing a selected item, the displayed screen including the first plurality of items,
in response to selection of one of the first plurality of items displayed on the screen, control the screen to display a first control area to display a second plurality of colors, such that the first control area corresponds to items of the second plurality of items displayed on the screen; and
reconfigure the second control area to correspond to the second plurality of items displayed on the screen, and display a speech bubble showing information relating to functions of the reconfigured second control area.

20. The electronic device of claim 19, wherein the controller controls the screen such that the plurality of different color indicators are visually distinguished from each other.

21. The electronic device of claim 19, wherein the controller controls the screen to provide a visual identifier with respect to a selected one of the items.

22. The electronic device of claim 19, wherein the specific function corresponds to execution of the selected item.

23. The electronic device of claim 19, wherein the specific function includes returning the screen to a previous display of items, or displaying a home screen of the electronic device.

24. The electronic device of claim 1, wherein the controller is configured to zoom in or zoom out specific items of the first plurality of items in response to a touch at the second control area.

25. The electronic device of claim 1, wherein the controller is configured to scroll up or down, in response to a touch at the first control area, to move to a next page or a previous page, or exit a currently activated application in response to a touch at the second control area.

26. The electronic device of claim 1, wherein the first plurality of items includes at least one of a menu, a widget, a folder or a file.

* * * * *